United States Patent
Mandia et al.

(10) Patent No.: US 12,058,434 B2
(45) Date of Patent: Aug. 6, 2024

(54) THIRD-PARTY MODIFICATIONS FOR A CAMERA USER INTERFACE

(71) Applicant: Snap Inc., Santa Monica, CA (US)

(72) Inventors: Patrick Mandia, Venice, CA (US); David Whyte, Toronto (CA)

(73) Assignee: Snap Inc., Santa Monica, CA (US)

( * ) Notice: Subject to any disclaimer, the term of this patent is extended or adjusted under 35 U.S.C. 154(b) by 185 days.

(21) Appl. No.: 17/354,995

(22) Filed: Jun. 22, 2021

(65) Prior Publication Data

US 2021/0409610 A1 Dec. 30, 2021

Related U.S. Application Data

(60) Provisional application No. 63/046,243, filed on Jun. 30, 2020.

(51) Int. Cl.
| | |
|---|---|
| *H04N 23/63* | (2023.01) |
| *G06F 3/04845* | (2022.01) |
| *G06F 16/245* | (2019.01) |
| *G06T 11/00* | (2006.01) |
| *H04N 5/272* | (2006.01) |

(52) U.S. Cl.
CPC ....... *H04N 23/631* (2023.01); *G06F 3/04845* (2013.01); *G06F 16/245* (2019.01); *G06T 11/00* (2013.01); *H04N 5/272* (2013.01)

(58) Field of Classification Search
CPC .... H04N 23/631; H04N 5/272; G06F 16/245; G06F 3/04845; G06T 11/00
See application file for complete search history.

(56) References Cited

U.S. PATENT DOCUMENTS

| | | | |
|---|---|---|---|
| 9,191,492 B1 * | 11/2015 | Miller | H04M 1/72469 |
| 10,334,173 B2 | 6/2019 | Jin et al. | |
| 10,943,311 B1 * | 3/2021 | Svenson | G06Q 30/0601 |
| 11,169,675 B1 * | 11/2021 | Anvaripour | H04L 51/52 |

(Continued)

FOREIGN PATENT DOCUMENTS

| | | |
|---|---|---|
| CN | 115769561 A | 3/2023 |
| WO | WO-2022006318 A1 | 1/2022 |

OTHER PUBLICATIONS

"International Application Serial No. PCT/US2021/039963, International Search Report dated Sep. 28, 2021", 7 pgs.

(Continued)

*Primary Examiner* — David E Choi
(74) *Attorney, Agent, or Firm* — Schwegman Lundberg & Woessner, P.A.

(57) ABSTRACT

In one or more implementations, a camera user interface of a client application may be accessed from a third-party application. The camera user interface may be modified based on input from a developer of the third-party application. Modifications to the camera user interface may be made according to a framework provided by a service provider related to the client application. The modifications to the camera user interface of the client application may be directed to modifying one or more user interface elements of an initial version of the camera user interface, modifying functionality available via the initial version of the camera user interface, or adding information related to the third-party application into the initial version of the camera user interface.

20 Claims, 12 Drawing Sheets

(56) References Cited

U.S. PATENT DOCUMENTS

| | | | |
|---|---|---|---|
| 2010/0026710 A1* | 2/2010 | Selvanandan | A63F 13/45 |
| | | | 715/764 |
| 2014/0049651 A1 | 2/2014 | Voth | |
| 2015/0365600 A1 | 12/2015 | Pollack et al. | |
| 2017/0034112 A1 | 2/2017 | Perlegos | |
| 2017/0264818 A1* | 9/2017 | Liao | H04N 23/62 |
| 2018/0300916 A1* | 10/2018 | Barnett | G06Q 10/10 |
| 2018/0364887 A1* | 12/2018 | Bell | H04L 67/52 |
| 2019/0082122 A1* | 3/2019 | Singh | H04N 5/2621 |
| 2019/0385373 A1* | 12/2019 | Mittleman | G06T 15/20 |
| 2020/0186728 A1* | 6/2020 | Pena | G06F 3/04845 |
| 2020/0273566 A1* | 8/2020 | Bhowmik | G06F 21/6245 |
| 2021/0096611 A1* | 4/2021 | Schenone | H04N 21/4316 |
| 2021/0374839 A1* | 12/2021 | Luo | G06Q 50/01 |
| 2021/0409610 A1* | 12/2021 | Mandia | H04L 51/18 |
| 2022/0294992 A1* | 9/2022 | Manzari | H04N 23/633 |

OTHER PUBLICATIONS

"International Application Serial No. PCT/US2021/039963, Written Opinion dated Sep. 28, 2021", 10 pgs.

Faga, Roberto, et al., "A Social Approach to Authoring Media Annotations", Document Engineering, ACM, 2 Penn Plaza, Suite 701 New York NY 10121-0701 USA, (Sep. 21, 2010), 17-26.

"International Application Serial No. PCT/US2021/039963, International Preliminary Report on Patentability dated Jan. 12, 2023", 12 pgs.

"European Application Serial No. 21758826.8, Response filed Aug. 18, 2023 to Communication pursuant to Rules 161(1) and 162 EPC dated Feb. 14, 2023", 33 pgs.

* cited by examiner

THIRD-PARTY MODIFICATIONS FOR A CAMERA USER INTERFACE

CROSS-REFERENCE TO RELATED APPLICATION

This patent application claims the benefit of U.S. Provisional Patent Application No. 63/046,243, filed Jun. 30, 2020, entitled "THIRD-PARTY MODIFICATIONS FOR A CAMERA USER INTERFACE" which is incorporated by reference herein in its entirety.

BACKGROUND

Applications executed by client devices may be used to generate content. For example, client applications may be used to generate messaging content, image content, video content, audio content, media overlays, documents, creative works, combinations thereof, and the like. In various situations, user content may be modified by augmented reality content. In at least some cases, the content being modified may be obtained from a third-party application.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
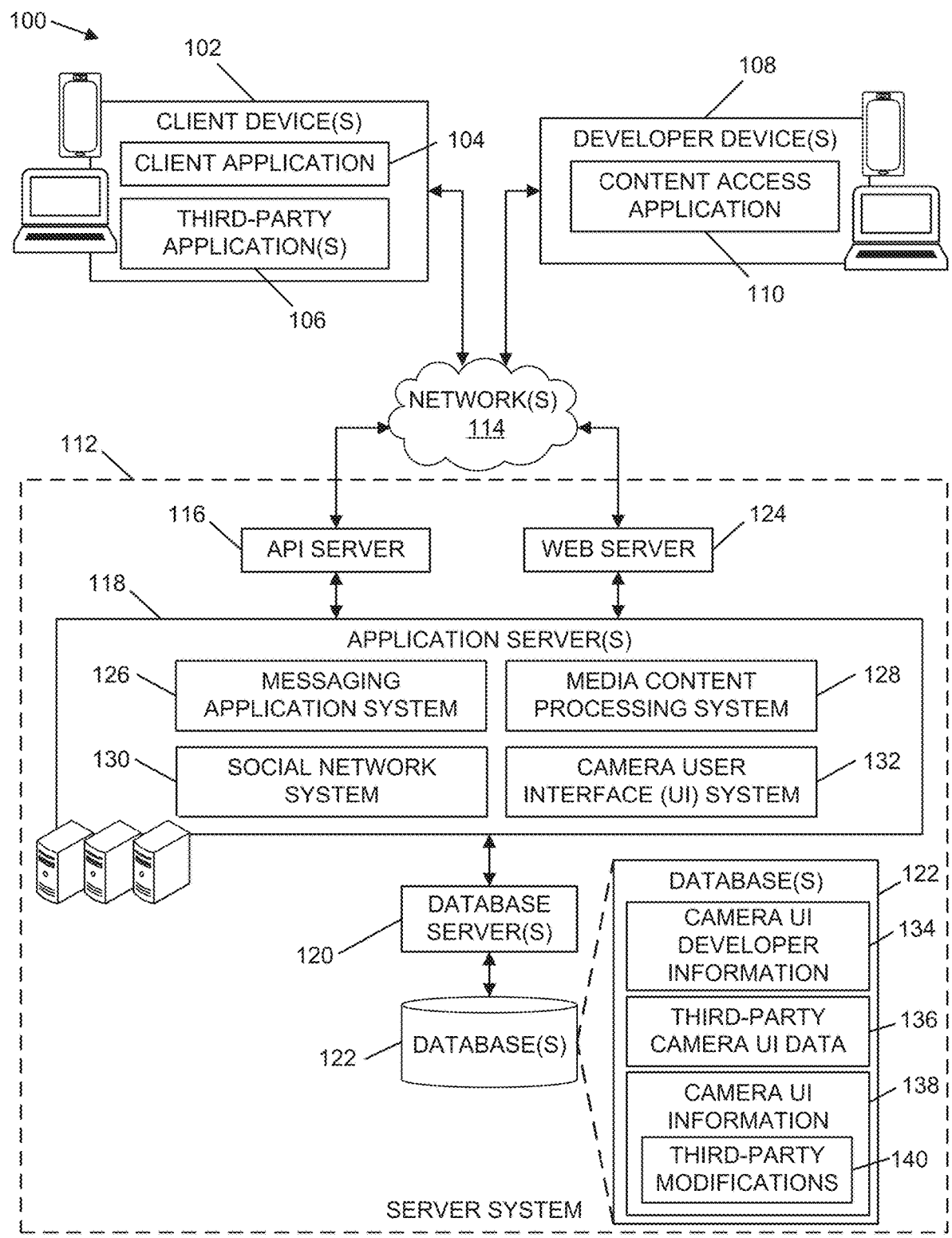
FIG. 1 is a diagrammatic representation of an architecture for exchanging data (e.g., messages and associated content) over a network, according to one or more example implementations.

Users may access content or create content via a number of applications that are executable by a computing device, such as a mobile computing device, smart phone, a tablet computing device, a laptop computing device, a portable gaming device, and the like. These applications may be referred to as "apps." In various instances, each app may be directed to one or more specified types of functionality. For example, some apps may be related to a merchant or service provider and used to access goods or services available for purchase by the merchant or service provider. In additional examples, apps may be used for communication in a social setting or in a business setting. Apps may also be used to create content, such as media content, word processing documents, spreadsheets, presentations, and so forth.

In a number of instances, users of an application may want to distribute content that is being created, accessed. or consumed via the application. In one or more examples, the applications that the users are using to create, access, or consume the content do not include functionality that enables users to share the content. In additional situations, the applications that are being used to create, access, or consume content include limited functionality to share the content. To illustrate, applications used to create, access, or consume content may be limited in the scope of distribution of the content. That is, users of an application used to create, access, or consume content may not have access to one or more social networks of the users. Further, applications that may be used to create, access, or consume content may have limited functionality to modify the content. For example, users may be unable to personalize or customize content that is created, accessed, or consumed via a given application.

In scenarios where functionality of an application is limited in relation to at least one of distribution or modification of content that is created, accessed, or consumed via the application, the application may enable users to launch one or more additional applications that provide enhanced functionality related to at least one of the distribution or the modification of content that is created, accessed, or consumed via the initial application. The systems, methods, techniques, instruction sequences, and computing machine program products described herein are directed to modifications made by a developer of a third-party application to a camera user interface of a client application that may be used to at least one of distribute content or modify content related to the third-party application. A service provider that has at least one of developed, maintained, or implemented the client application may provide a framework that enables developers of third-party applications to access functionality of the client application. The framework may include a software development kit (SDK) that includes at least one of tools, libraries, documentation, computer-readable code, processes, requirements, or application programming interfaces (APIs) related to at least one of distributing or modifying third-party content using the client application.

In one or more implementations, developers may utilize the framework to modify a camera user interface of the client application. The camera user interface may display a field of view captured by one or more cameras of a client device. A default version of the camera user interface may also include a number of user interface elements that are selectable to invoke functionality of the client application. For example, a default version of the camera user interface may include a user interface element related to search operations. To illustrate, a default version of the camera user interface may include a user interface element that captures information to search for at least one of contacts or content that is accessible via the client application. In addition, a default version of the camera user interface may include one or more user interface elements related to navigation within the client application. The one or more navigation user interface elements of the default camera user interface may be selectable to access content via the client application.

The camera user interface developer framework may enable a developer to modify the default version of the camera user interface by removing one or more of the user interface elements that are included in the default version of the camera user interface. In one or more examples, the camera user interface developer framework may enable a developer to remove at least one user interface element of the default camera user interface directed to search functionality of the client application. In one or more additional examples, the camera user interface developer framework may enable a developer to remove at least one user interface element of the default camera user interface directed to navigation within the client application.

Further, the camera user interface developer framework may enable a developer to add at least one of information or user interface elements to customize the camera user interface. In some existing systems, image content or video content may be provided from a third-party application to a client application for distribution via the client application. In implementations described herein, a third-party application may provide information to the client application for display via the camera interface that is in addition to image content or video content provided by the third-party application. In additional scenarios, the third-party application may refrain from providing image content or video content to the client application and other content may be provided to the client application in relation to information corresponding to the third-party application. In one or more examples, the third-party application may include media player functionality. In these situations, the modified version of the camera user interface may include information related to media that is being consumed via the third-party application. For example, a modified version of the camera user interface may include information about the media consumed via the third-party application, such as a song title and artist or a movie title. In various examples, a modified version of the camera user interface may also include graphical content corresponding to the third-party application. To illustrate, a modified version of the user interface may include a logo or image corresponding to the third-party application or a logo or image related to media content being consumed via the third-party application.

In one or more implementations, users of the client application may also make changes to the modified version of the camera user interface that includes content related to the third-party application. In one or more scenarios, a user of the client application may remove at least a portion of the content related to the third-party application before distributing, using the client application, image content or video content captured via the camera user interface. In one or more illustrative examples, a user of the client application may remove information describing media content consumed using the third-party application from a modified version of the camera user interface before distributing content captured via the camera user interface using the client application. Additionally, a user of the client application may add or modify image content or video content displayed in the modified version of the camera user interface. To illustrate, at least one of overlays, annotations, or augmented reality content may be added to image content or video content displayed in the modified version of the camera user interface. In these situations, content distributed via the client application may include the image content or video content captured by at least one camera of a client device executing the client application, content related to the third-party application, and modifications to the image content or video content that were added using the client application.

The implementations described herein enable developers of third-party applications to leverage the functionality of a client application that may be unavailable or limited within the third-party applications, while also enabling developers of third-party applications to customize a user experience within the client application. The customization of a camera user interface described with respect to implementations herein is available due to a developer framework that includes software tools, computer-readable code, rules, API information, or one combinations thereof, that are unavailable to developers with respect to existing systems, methods, and client applications. In addition, users of the client application are provided the flexibility to incorporate content related to third-party applications into additional content generated using a client application or to remove content related to third-party applications with respect to additional content generated using a client application.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

The architecture 100 may also include one or more developer devices 108. The one or more developer devices 108 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100. The developer devices 108 may be used by one or more developers in at least one of creating or modifying a third-party application 106. As used herein, the terms "developer," third-party developer," and "third-party application developer" are not limited to actual developers as such, but may include persons and entities that are hosting, providing, maintaining, creating, or have ownership rights with respect to the third-party application 106.

The developer device(s) 108 may at least one of store or execute a content access application 110. The content access application 110 may enable the developer device(s) 108 to at least one of obtain, view, or communicate with respect to servers, websites, applications, data stores, or other content storage repositories. In one or more illustrative examples, the content access application 110 may include a browser application. In one or more additional examples, the content access application 110 may access content that may be used in relation to the development, modification, or creation of at least one of the third-party application 106 or the client application 104.

Each instance of the client application 104 and the content access application 110 is able to communicate and exchange data with at least one of another instance of the client application 104, one or more third-party applications 106, another instance of the content access application 110, or a server system 112. The data exchanged between instances of the client applications 104, between the third-party applications 106, between instances of the content access application 110, between instances of the client application 104 and the third-party application 106, between instances of the content access application 110 and the server system 112, and between instances of the client application 104 and the server system 112 includes functions (e.g., commands to invoke functions) and payload data (e.g., text, audio, image, video, or other multimedia data). Data exchanged between instances of the client applications 104, between the third-party applications 106, between at least one instance of the client applications 104 and at least one instance of the content access application 110, and between at least one instance of the client application 104 and at least one third-party application 106 may be exchanged directly from an instance of an application executed by a client device 102 and an instance of an application executed by an additional client device 102 or an application executed by a developer device 108. Further, data exchanged between the client applications 104, between the third-party applications 106, between the content access application 110 and at least one of the third-party application 106 or the client application 104, and between at least one client application 104 and at least one third-party application 106 may be communicated indirectly (e.g., via one or more intermediate servers) from an instance of an application executed by a client device 102 to another instance of an application executed by an additional client device 102 or by a developer device 108. In one or more illustrative examples, the one or more intermediate servers used in indirect communications between applications may be included in the server system 112.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 112 provides server-side functionality via one or more networks 114 to at least one of the client application 104 or the content access application 110. The server system 112 may be a cloud computing environment, according to some example implementations. For example, the server system 112, and one or more servers associated with the server system 112, may be associated with a cloud-based application, in one illustrative example. In one or more implementations, the client device 102 and the server system 112 may be coupled via the one or more networks 114.

The server system 112 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104. The server system 112 may be at least one of implemented or maintained by a service provider that provides one or more services via the client application 104. The one or more services may be related to social networking, messaging, content creation, content consumption, online retail, or one or more combinations thereof.

While certain functions of the architecture 100 are described herein as being performed by either a client application 104 or by the server system 112, the location of functionality either within the client application 104 or the server system 112 is a design choice. For example, it may be technically preferable to initially deploy certain technology and functionality within the server system 112, but to later migrate this technology and functionality to the client application 104 where a client device 102 has a sufficient processing capacity.

The server system 112 includes an Application Programming Interface (API) server 116 that is coupled to, and provides a programmatic interface to, an application server 118. The application server 118 is communicatively coupled to a database server 120 that facilitates access to one or more databases 122. The one or more databases 122 may store data associated with information processed by the application server 118. The one or more databases 122 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 122 may further store information related to third-party servers, client devices 102, client applications 104, users, third-party applications 106, and so forth.

The API server 116 receives and transmits data (e.g., commands and message payloads) between at least one of client devices 102 or developer devices 108 and the application server 118. Specifically, the Application Program Interface (API) server 116 provides a set of interfaces (e.g., routines and protocols) that can be called or queried by the client application 104 in order to invoke functionality of the application server 118. The Application Program Interface (API) server 116 exposes various functions supported by the application server 118, including account registration, login functionality, the sending of messages, via the application server 118 from one instance of the client application 104 to another instance of the client application 104, the sending of media files (e.g., images, audio, video) from a client application 104 to the application server 118, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104). The API server 116 may also provide access by developer devices 108 to frameworks that may be used to modify or customize a camera user interface in relation to content corresponding to third-party applications 106.

The server system 112 may also include a web server 124. The web server 124 is coupled to the application servers 118, and provides web-based interfaces to the application servers 118. To this end, the web server 124 processes incoming network requests over the Hypertext Transfer Protocol (HTTP) and several other related protocols.

The application server 118 hosts a number of applications and subsystems, including a messaging application system 126, a media content processing system 128, a social network system 130, and a camera user interface system 132. The messaging application system 126 implements a number of message processing technologies and functions, particularly related to the aggregation and other processing of content (e.g., textual and multimedia content) included in messages received from multiple instances of the client application 104. For example, the messaging application system 126 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 126 may aggregate text and media content from multiple sources into collections of content. These collections are then made available, by the messaging application system 126, to the client application 104. Other processor- and memory-intensive processing of data may also be performed server-side by the messaging application system 126, in view of the hardware requirements for such processing.

The media content processing system 128 is dedicated to performing various media content processing operations, typically with respect to images, audio, or video received within the payload of a message or other content item at the messaging application system 126. The media content processing system 128 may access one or more data storages (e.g., the database(s) 122) to retrieve stored data to use in processing media content and to store results of processed media content.

The social network system 130 supports various social networking functions and services, and makes these functions and services available to the messaging application system 126. To this end, the social network system 130 maintains and accesses an entity graph within the database (s) 122. Examples of functions and services supported by the social network system 130 include the identification of other users of the client application 104 with which a particular user has relationships or is "following", and also the identification of other entities and interests of a particular user. The social network system 130 may access location information associated with each of the user's friends or other social network connections to determine where they live or are currently located geographically. In addition, the social network system 130 may maintain a location profile for each of the user's friends indicating the geographical location where the user's friends live.

The camera user interface (UI) system 132 may be used to generate modified versions of a camera user interface that is displayed via the client application 104. The camera user interface may display a field of view of at least one camera of a client device 102. The camera user interface may also include one or more user interface elements that are selectable to at least one of invoke functionality of the client application 104 or perform one or more operations supported by the client application 104. A default version of the camera user interface may include one or more first user interface elements that are selectable to access content via the client application 104. A default version of the camera user interface may also include one or more second user interface elements that are selectable to search for at least one of users of the client application 104 or content related to the client application 104. In addition, a default version of the camera user interface may include one or more third user interface elements that are selectable to access augmented reality content that may be applied to at least one of image content or video content displayed in the camera user interface. Further, a default version of the camera user interface may include one or more fourth user interface elements corresponding to one or more tools that may be applied to at least one of image content or video content displayed in the camera user interface, such as a timer tool, a flash tool, a tool to display a grid in the camera user interface, one or more combinations thereof, and so forth.

In one or more implementations, the camera UI system 132 may obtain information from developer devices 108 to modify a default version or an initial version of a camera user interface. In one or more examples, the camera UI system 132 may provide access by developer devices 108 to camera UI developer information 134 stored by the database(s) 122. In various examples, the developer devices 108 may access the camera UI developer information 134 via the content access application 110. The camera UI developer information 134 may include at least one of tools, libraries, documentation, computer-readable code, processes, guidelines, one or more combinations thereof, and the like, that may be used to generate a modified version of the camera user interface. In various examples, the camera UI developer information 134 may include an SDK that may be used to modify a camera user interface of the client application 104. In one or more additional examples, the camera UI developer information 134 may include one or more APIs that may be used to modify a camera user interface of the client application 104.

The camera UI system 132 may provide one or more user interfaces to the developer devices 108 that may be used to make modifications to a camera user interface of the client application 104 according to the camera UI developer information 134. For example, the camera UI system 132 may provide one or more user interfaces that enable a developer of a third-party application 106 to remove user interface elements that may be included in an initial version or a default version of the camera user interface of the client application 104. For example, the camera UI system 132 may provide one or more user interfaces that enable a developer of a third-party application 106 to remove one or more user interface elements of a camera user interface that are directed to at least one of accessing content generated using the client application 104, sharing content generated by the client application 104, or modifying content displayed in the camera user interface of the client application 104. In one or more examples, the user interface elements that may be removed from a default version of a camera user interface of the client application 104 may be indicated by the camera UI developer information 134.

The camera UI system 132 may also provide one or more user interfaces to developer devices 108 to add content to a default version or an initial version of a camera user interface of the client application 104. In various examples, content added to a default version of a camera user interface of the client application 104 may include at least one of image content, text content, or video content corresponding to a third-party application 106. Image content, text content, video content, or one or more combinations thereof, obtained from developers of third-party applications 106 may be stored in the database(s) 122 as third-party UI data 136. The third-party UI data 136 may include data related to logos related to third-party applications 106, identifiers (e.g., brands, company names, product names, etc.) related to third-party applications 106, animations related to third-party applications 106, augmented reality content related to third-party applications 106, or one or more combinations thereof.

In one or more implementations, the third-party UI data 136 may also include data that is communicated from the third-party application 106 to the client application 104 when the client application 104 is launched from an instance of the third-party application 106. In one or more scenarios, information related to data that is at least one of generated by the third-party application 106 or corresponds to content consumed via the third-party application 106 may be sent from a client device 102 executing an instance of the third-party application 106 to the server system 112 and stored as part of the third-party UI data 136. The third-party UI data 136 may also include addresses, links, or other uniform resource indicators that correspond to content related to third-party applications 106, where the addresses, links, or other uniform resource indicators may be provided by developers of the third-party applications 106. The addresses, links, or other uniform resource indicators may be used by at least one of the client application 104 or the server system 112 to retrieve content that is to be displayed in a modified version of a camera user interface of the client application 104.

Additionally, the third-party UI data 136 may indicate at least one of formatting or placement related to information obtained from developer devices 108 that is to be displayed in a modified version of the camera user interface. In one or more examples, the third-party UI data 136 may indicate locations of at least one of image content, text content, or video content obtained from developer devices 108 within a modified version of the camera user interface. The third-party UI data 136 may also include sizing information, font information, visual effects information, color information, or one or more combinations thereof, of at least one of text content, video content, or image content obtained from developer devices 108 and to be displayed in a modified version of the camera user interface. Further, the third-party UI data 136 may include layout information indicating arrangements of content with respect to one another within a modified version of the camera user interface.

In various examples, the third-party UI data 136 may indicate user interface elements designed by developers of third-party applications 106 that are selectable to perform one or more actions within the client application 104. In one or more examples, the camera UI developer information 134 may provide one or more tools for developers of third-party applications 106 to design user interface elements that are selectable to perform actions within the client application 104. In one or more additional examples, the camera UI developer information 134 may include a number of previously generated user interface elements that correspond to one or more actions that may be executed by the client application 102. In these scenarios, developers of third-party applications 106 may select one or more user interface elements from the number of previously generated user interface elements to include in a modified version of the camera user interface. In one or more illustrative examples, actions to be performed in response to selection of one or more user interface elements chosen by developers of third-party applications 106 may include at least one of providing additional information about a media content item being consumed via the third-party application 106, adding content related to the third-party application 106 into a message communicated via the client application 104, or include content related to the third-party application 106 in social networking content that may be communicated using the client application 104.

The database(s) 122 may also store camera UI data 138 that corresponds to a camera user interface that is displayed via the client application 104. For example, the camera UI data 136 may indicate features of a default version of the camera user interface. In various examples, the camera UI developer information 134 may indicate that developers of third-party applications 106 may at least one of modify or remove at least a portion of the features of the default version of the camera user interface using tools corresponding to the camera UI developer information 134. In one or more additional examples, the camera UI developer information 134 may indicate that at least a portion of the features of the default version of the camera user interface may not be at least one of modified or removed by developers of third-party applications 106. In one or more implementations, the camera UI data 138 may indicate one or more user interface elements included in the default version of the camera user interface displayed via the client application 104. The one or more user interface elements may be related to search functionality, content sharing functionality, creative tools, augmented reality content, content accessing functionality, or one or more combinations thereof.

The camera UI data 138 may include third-party modifications 140. The third-party modifications 140 indicate changes to a default version of the camera user interface that are made by developers of third-party applications 106 based on the camera UI developer information 134. In one or more examples, third-party modifications 140 may indicate one or more respective modifications that correspond to individual third-party applications 106. That is, modifications of a default version of the camera user interface that correspond to a respective third-party application 106 may be stored such that in response to launching the client application 104 from the respective third-party application 106, the modifications are retrieved from the database(s) 122 and implemented by the client application 104. In various examples, modifications included in the third-party modifications 140 for a respective third-party application 106 may be stored in association with an identifier of the respective third-party application 106.

In one or more illustrative examples, a user of the client device 102 may launch an instance of the third-party application 106. The instance of the third-party application 106 may be launched in response to selection of a user interface element, such as an icon, that corresponds to the third-party application 106. Selection of the user interface element corresponding to the third-party application 106 may cause at least one user interface of the third-party application 106 to be displayed via a display device of the client device 102. In one or more examples, at least one user interface of the third-party application 106 may include a user interface element that is selectable to launch an instance of the client application 104 on the client device 102. In various examples, launching an instance of the client application 104 from the third-party application 106 may cause at least one user interface of the client application 104 to be displayed via the client device 102. In one or more scenarios, the third-party application 106 may operate in the background after an instance of the client application 104 has been launched from the third-party application 106. A user interface element included in a user interface of the third-party application 106 that corresponds to the client application 104 may be associated with a uniform resource identifier, such as a link or address, that causes the camera user interface of the client application 104 to be displayed.

The launching of the client application 104 from the third-party application 106 may cause a camera user interface of the client application 104 to be displayed via a display device of the client device 102. In one or more examples, content previously displayed via the third-party application 106 may be included in the camera user interface. For example, at least one of text content, video content, or image content displayed via a user interface of the third-party application 106 from which an instance of the client application 104 was launched may be displayed in the camera user interface of the client application 104. In this way, the client application 104 may obtain content from the third-party application 106 to include in the camera user interface. In additional examples, audio content being consumed via the third-party application 106 when an instance of the client application 104 was launched from the third-party application 106 may continue to be played via one or more output devices of the client device 102.

In one or more examples, the client application 104 may obtain content from the server system 112 to include in a modified version of the camera user interface. For example, the camera UI system 132 may send a portion of the third-party UI data 136 related to a third-party application 106 to the client application 104 such that the information related to the third-party application 106 may be displayed in a modified version of the camera user interface. The camera UI system 132 may also send information to the client application 104 indicating at least one of user interface elements or layout information for a modified version of the camera interface to be displayed via the client application 104 in response to launching the client application 104 from the third-party application 106.

In various examples, in response to receiving an indication from at least one of the client application 104 or the third-party application 106, the camera UI system 132 may query the database(s) 122 with respect to at least one of the third-party UI data 136 or the third-party modifications 140 to determine data to send to the client application 104 corresponding to a modified camera user interface of the client application 104. The information provided by the camera UI system 132 to the client application 104 may indicate at least one of one or more user interface elements, text content, video content, or image content to include in a modified version of the camera user interface. In this way, the client application 104 may use information obtained from the server system 112 to generate a customized version of the camera user interface of the client application 104 that corresponds to the third-party application 106 from which the client application 104 was launched.

In one or more implementations, users of the client application 104 may further alter content displayed via the modified version of the camera user interface. To illustrate, augmented reality content may be applied to at least one of image content or video content displayed in a modified version of the camera user interface. Additionally, at least one of overlays or annotations may be applied to at least one of image content or video content displayed in a modified version of the camera user interface of the client application 104. Content may also be removed from a modified version of the camera user interface by users of the client application 104. In one or more examples, content related to the third-party application 106 that was included in a modified version of the camera user interface may be removed by users of the client application 104.

The content displayed in the modified version of the camera user interface may be captured and shared with additional users of the client application 104. For example, image content captured via at least one camera of the client device 102 may be displayed in a modified version of the camera user interface. In addition, content related to the third-party application 106 from which the client application 104 was launched may also be displayed in conjunction with the image content. The client application 104 may generate additional content that includes the image content captured by the at least one camera of the client device 102 and information related to the third-party application 106 that is obtained from at least one of the instance of the third-party application 106 that launched the client application 104 or the server system 112. In one or more illustrative examples, the additional content may include an image of a user of the client application 104 captured via at least one camera of the client device 102 and information indicating a song that the user was listening to via the third-party application 106. In one or more additional illustrative examples, the additional content may include an image of the user of the client application 104 captured via at least one camera of the client device 102 and fitness information, such as an exercise routine or a biking route, generated by the third-party application 106.

Figure 2:
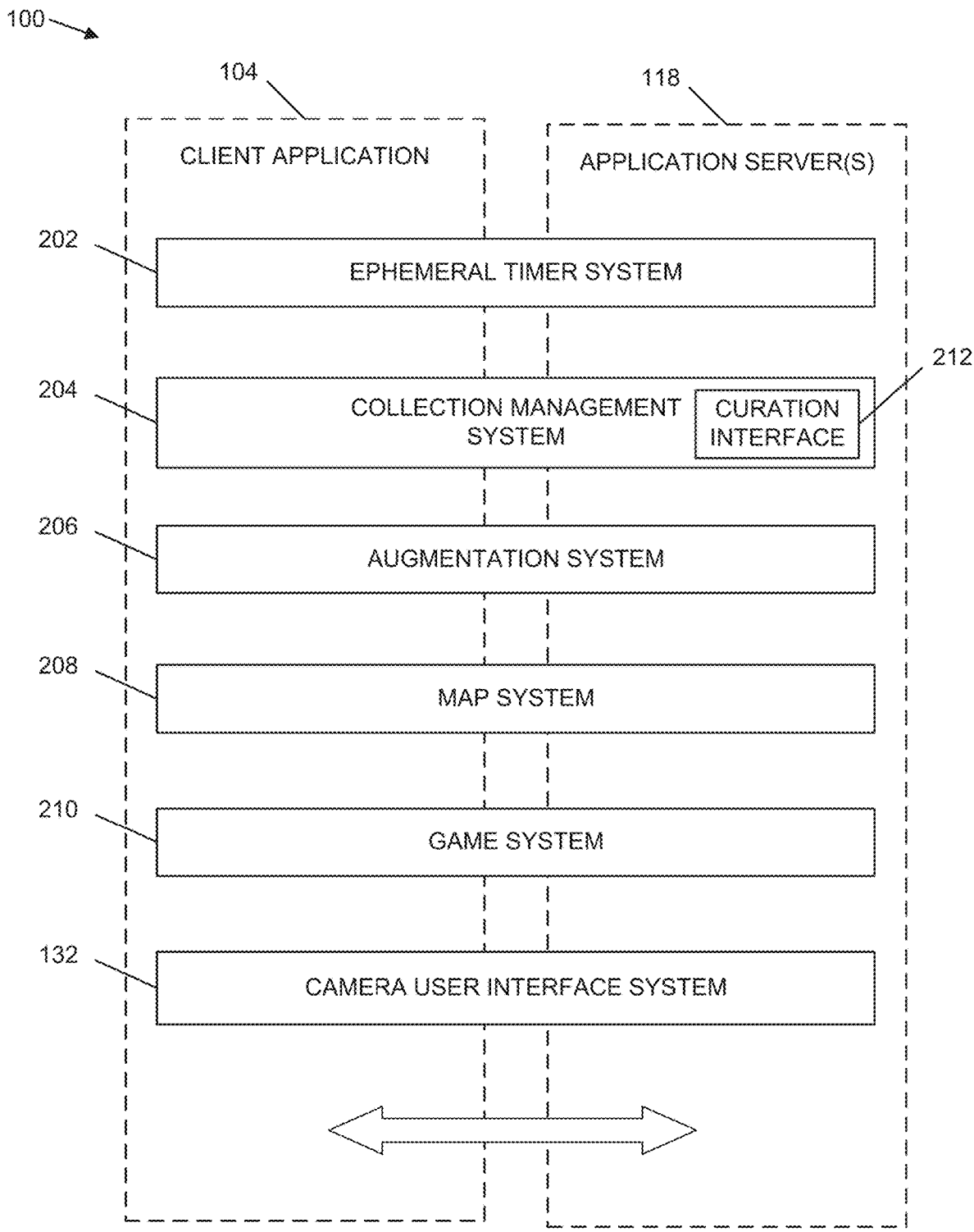
FIG. 2 is a diagrammatic representation of a system, in accordance with some examples, that may have both client-side and server-side functionality.

FIG. 2 is a block diagram illustrating further details regarding the server system 112, according to some examples. Specifically, the server system 112 is shown to comprise the client application 104 and the application servers 118. The server system 112 embodies a number of subsystems, which are supported on the client-side by the client application 104 and on the sever-side by the application servers 118. These subsystems include, for example, an ephemeral timer system 202, a collection management system 204, an augmentation system 206, a map system 208, a game system 210, and the camera UI system 132.

The ephemeral timer system 202 is responsible for enforcing the temporary or time-limited access to content by the client application 104 and the messaging application system 126. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 112. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 122 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 112 from a specific geographic location may be displayed within the context of a map at that particular location to "friends" of a specific user on a map interface of the client application 104. A user can furthermore share his or her location and status information (e.g., using an appropriate status avatar) with other users of the server system 112 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 112. The server system 112 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The camera UI system 132 may obtain information from developers of third-party applications that may be used to generate modified versions of the client application 104. In one or more examples, the camera UI system 132 may enable developers of third-party applications 106 to at least one of add or remove content from a default camera user interface of the client application 104 to create a modified version of the camera user interface. The modified version of the camera user interface may be used to generate additional content via the client application 104 that can be distributed to additional users of the client application 104. In one or more examples, the additional content generated using a modified version of the camera interface of the client application 104 may include augmented reality content that is applied via the augmentation system 206.

Figure 3:
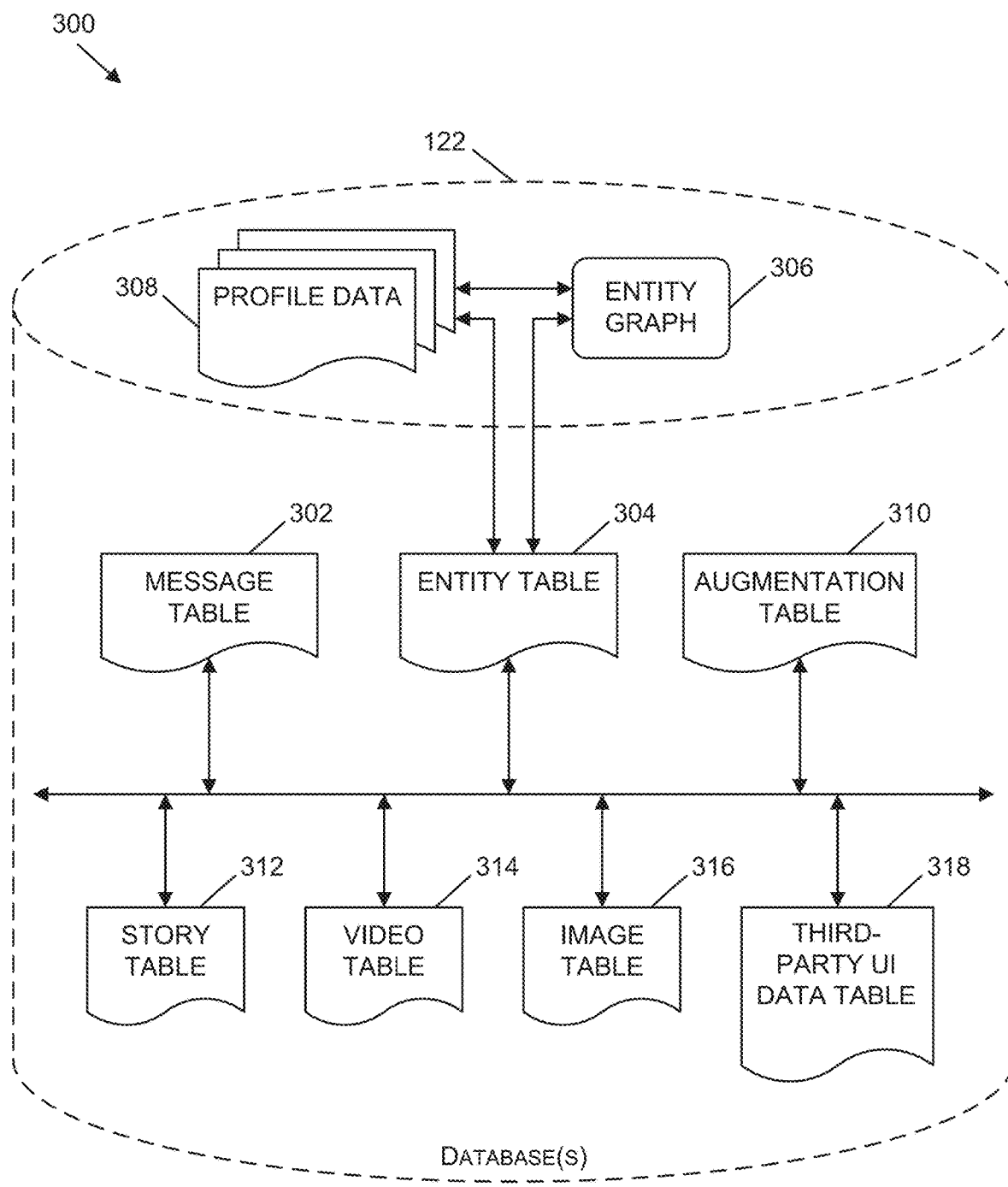
FIG. 3 is a schematic diagram illustrating data that may be stored in a database of a server system, according to one or more example implementations.

FIG. 3 is a schematic diagram illustrating data structures 300 which may be stored in the database(s) 122 of the server system 112, according to one or more example implementations. While the content of the database(s) 122 is shown to comprise a number of tables, it will be appreciated that the data could be stored in other types of data structures (e.g., as an object-oriented database).

The database 122 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 112 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 122 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 122 may also store third-party UI data table 318. The third-party UI data table 318 may include data structures for individual third-party applications 106 that may be used to launch an instance of the client application 104. The data structures included in the UI data table 318 for a respective third-party application 106 may indicate information that may be used to generate a modified version of a camera user interface of the client application 104. The information may indicate at least one of text content, image content, or video content that may be added to a camera user interface of the client application 104. In various examples, the data structures included in the third-party UI data table 318 may indicate storage locations for information to be included in a modified version of the camera user interface of the client application 104, such as at least one of one or more uniform resource indicators, one or more links, one or more addresses, or one or more file paths. The data structures included in the third-party UI data table 318 may also store information indicating a layout for a modified version of the camera user interface of the client application 104. The layout may include one or more user interface elements to be included in the modified version of the camera user interface and respective locations of the one or more user interface elements. The layout may also include location information for content related to the respective third-party application 106 within the modified version of the camera user interface of the client application 104. In one or more additional examples, data structures included in the third-party UI data table 318 may include, for a respective third-party application 106, at least one of information indicating editing actions that users of the client application 104 may perform with respect to content included in the modified version of the camera user interface or actions within the client application 104 that may be performed with respect to content generated using the modified version of the camera user interface of the client application 104.

Figure 4:
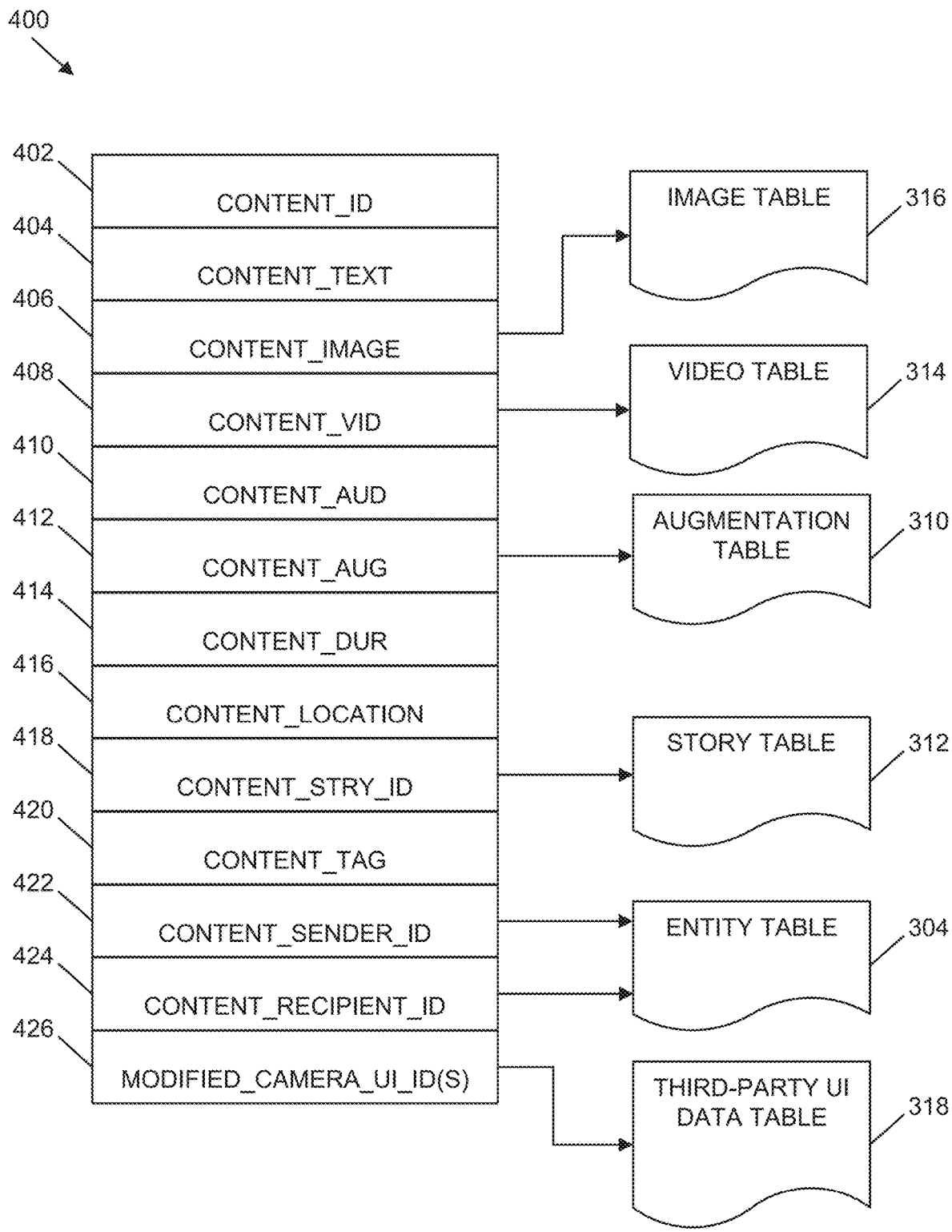
FIG. 4 is a schematic diagram illustrating an example framework for content that may be accessible via a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 112. In situations where the content 400 includes a message, the content 400 may be used to populate the message table 302 stored within the database(s) 122 and accessible by the application server 114. In one or more implementations, the content 400 may be stored in memory as "in-transit" or "in-flight" data of at least one of client devices 102 or the application server 114. The content 400 is shown to include at least a portion of the following components:

- content identifier 402: a unique identifier that identifies the content 400.
- content text payload 404: text, to be generated by a user via a user interface of the client device 102, and that is included in the content 400.
- content image payload 406: image data, captured by a camera component of a client device 102 or retrieved from a memory component of a client device 102, and that is included in the content 400. Image data for a sent or received content 400 may be stored in the image table 316.
- content video payload 408: video data, captured by a camera component or retrieved from a memory component of the client device 102, and that is included in the content 400. Video data for a sent or received content 400 may be stored in the video table 314.
- content audio payload 410: audio data, captured by a microphone or retrieved from a memory component of the client device 102, and that is included in the content 400.
- content augmentation data 412: augmentation data (e.g., filters, stickers, or other annotations or enhancements) that represents augmentations to be applied to content image payload 406, content video payload 408, or content audio payload 410 of the content 400. Augmentation data for sent or received content 400 may be stored in the augmentation table 310.
- content duration parameter 414: parameter value indicating, in seconds, the amount of time for which one or more portions of the content 400 (e.g., the content image payload 406, content video payload 408, content audio payload 410) are to be presented or made accessible to a user via the client application 104.
- content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).
- content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.
- content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.
- content sender identifier 422: an identifier (e.g., a messaging system identifier, email address, or device identifier) indicative of a user of the client device 102 on which the content 400 was generated and from which the content 400 was sent.
- content receiver identifier 424: an identifier (e.g., a messaging system identifier, email address, or device identifier) indicative of a user of the client device 102 to which the content 400 is addressed.
- modified camera user interface identifier(s) 426: one or more identifiers of additional content related to a third-party application 106 that may be included in the content 400 or accessible via the client application 104. The modified camera user interface identifier(s) 426 may correspond to text content, image content, video content, audio content, or one or more combinations thereof, related to the third-party application 106.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentation data 412 may point to data stored in an augmentation table 310, values stored within the content story identifier 418 may point to data stored in a story table 312, and values stored within the content sender identifier 422 and the content receiver identifier 424 may point to user records stored within an entity table 304. The modified camera user interface identifiers 426 may point to information related to a third-party application 106 that is stored by the third-party UI data table 318 that may be rendered by the client application 104 in conjunction with the content 400.

Figure 5:
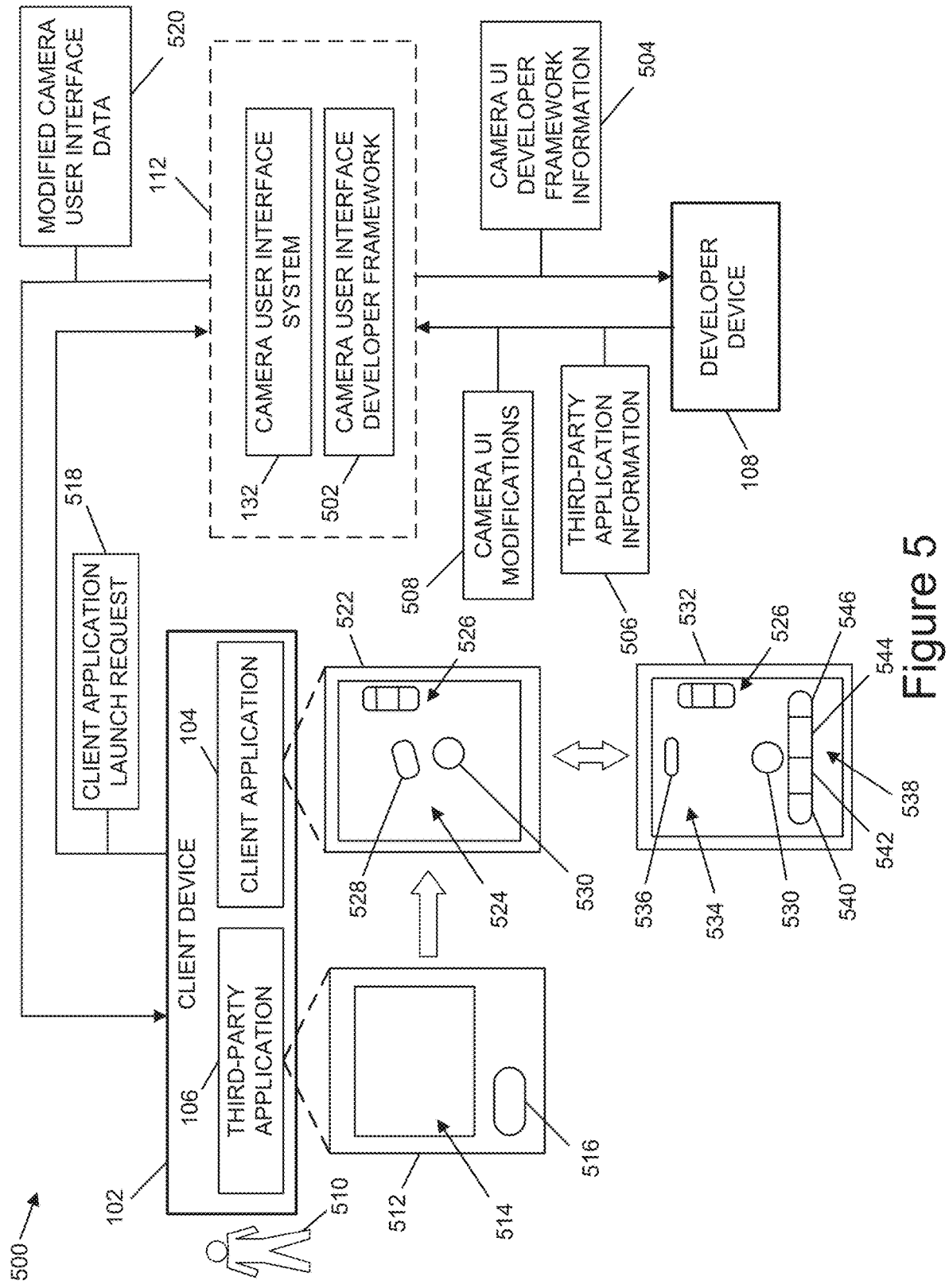
FIG. 5 is a diagrammatic representation illustrating an architecture to modify a camera user interface based on third-party modifications, in accordance with one or more example implementations.

FIG. 5 is a diagrammatic representation illustrating an architecture 500 to modify a camera user interface based on third-party modifications, in accordance with one or more example implementations. The architecture 500 may include the server system 112 that includes the camera user interface system 132. The camera user interface system 132 may enable developers of third-party applications 106 to customize a camera user interface of the client application 104. For example, an instance of the client application 104 may be launched from an instance of the third-party application 106 and a target user interface that is displayed when the client application 104 is launched may include a modified version of a camera user interface of the client application 104. In this way, a customized version of the camera user interface of the client application 104 may be displayed in response to launching the client application 104 from the third-party application 106 rather than a default home page of the client application 104.

The camera user interface system 132 may provide a camera user interface developer framework 502 that may be used by developers of third-party applications 106 to generate a customized version of the camera user interface of the client application 104. The camera user interface developer framework 502 may include a number of tools that may be used by the developers of third-party applications 106 to modify a camera user interface of the client application 104. For example, the camera user interface developer framework 502 may include a software developer kit that may be used to modify a camera user interface of the client application 104. Additionally, the camera user interface developer framework 502 may include example software code, rules, one or more application programming interfaces, or one or more combinations thereof. In various examples, the rules included in the camera user interface developer framework 502 may include specifications for content and parameters around modifications that may be made to the camera user interface of the client application 104 in order for the customized versions of the camera user interface of the client application 104 to be implemented efficiently by the server system 144. In one or more examples, the rules of the camera user interface developer framework 502 may indicate file types that are supported by the camera user interface of the client application 104. The rules of the camera user interface developer framework 502 may also indicate features of the camera user interface of the client application 104 that are modifiable and features of the camera user interface of the client application 104 that are not modifiable. Additionally, the camera user interface developer framework 502 may indicate a number of user interface elements that may be included in customized versions of the camera user interface of the client application 104, actions that may be performed with respect to content included in camera user interfaces of the client application 104, or combinations thereof.

The server system 112 may provide access to the camera user interface developer framework 502 by developer devices 108 of developers of third-party applications 106. In various examples, the camera user interface system 132 may provide camera user interface developer framework information 504 to one or more developer devices 108. In one or more examples, the camera user interface developer framework information 504 may include or be provided via one or more user interfaces that may display information related to the camera user interface developer framework 502 and that may include one or more user interface elements that are selectable to implement features of the camera user interface developer framework 502. The camera user interface developer framework information 504 may include one or more user interface elements that may capture input indicating at least one of user interface elements to include in a customized camera user interface of the client application 104, information related to third-party applications 106 that is to be displayed within a customized camera user interface of the client application 104, or layouts of information and user interface elements for a customized camera user interface of the client application 104.

In one or more implementations, the developer device 108 may send third-party application information 506 to the server system 112 in accordance with the camera user interface developer framework 502. The third-party application information 506 may include information related to a third-party application 106 that is to be displayed within a camera user interface of the client application 104. The third-party application information 506 may indicate information that is to be passed from the third-party application 106 to the client application 104 and that is to be displayed in the camera user interface of the client application 104. In situations where the third-party application 106 is a media player application, the third-party application information 506 may indicate that one or more identifiers of media being consumed via the third-party application 106 are to be passed to the client application 104 for display in the camera user interface of the client application 104. The third-party application information 506 may also indicate branding information related to the third-party application 106, such as a name of the third-party application, a logo of the third-party application 106, and the like. In further examples, the third-party application information 506 may include at least one of image content, video content, audio content, or text content related to third-party applications 106. In one or more examples, the third-party application information 506 may include location information from which portions of the third-party application information 506 may be retrieved, such as uniform resource indicators, pathways, addresses, and so forth. In one or more additional examples, the third-party application information 506 may include copies of content related to the third-party application 106 that may be stored in one or more databases that are accessible to the server system 112.

The developer device 108 may also send camera user interface modifications 508 to the server system 112 in accordance with the camera user interface developer framework 502. The camera user interface modifications 508 may indicate changes to the camera user interface of the client application 104 to generate a customized version of the camera user interface. In one or more examples, the camera user interface modifications 508 may indicate at least one of one or more user interface elements that may be added to the camera user interface or one or more user interface elements that may be removed from the camera user interface. The camera user interface modifications 508 may also indicate changes to the layout of information or the layout of user interface elements of the camera user interface of the client application 104. In further examples, the camera user interface modifications 508 may indicate operations that may be performed with respect to content that may be displayed via the camera user interface.

In various implementations, a user 510 of the client device 102 may launch an instance of a third-party application 106. The third-party application 106 may include a gaming application, a health and fitness application, a media consumption application, a content access application, a navigation application, an ecommerce application, a social networking application, one or more combinations thereof, and the like. A third-party application user interface 512 may be displayed via the third-party application 106 and may include content 514. The third-party application user interface 512 may also include a user interface element 516 that is selectable to launch an instance of the client application 104 on the client device 102. In one or more examples, the third-party application 106 may continue to operate after launching an instance of the client application 104.

In various examples, in response to selection of the user interface element 516, a client application launch request 518 may be sent to the server system 112. The client application launch request 518 may be sent to the server system 112 to obtain information related to the third-party application 106 that may be displayed within the client application 104. In one or more examples, at least a portion of the information related to the third-party application 106 that is displayed via the client application 104 is accessible to the server system 112. In one or more additional examples, at least a portion of the information related to the third-party application 106 that is displayed via the client application 104 is stored by the client device 102.

In response to receiving the client application launch request 518, the camera user interface system 132 may retrieve information used to render a camera user interface of the client application 104 that is related to the third-party application 106. The information retrieved by the camera user interface system 132 in response to the client application launch request 518 may include at least portions of the third-party application information 506. Additionally, the information retrieved by the camera user interface system 132 in response to the client application launch request 518 may include at least portions of the camera user interface modifications 508. In various examples, the client application launch request 518 may include an identifier of the third-party application 106 that the camera user interface system 132 may use to retrieve the information related to the third-party application 106 to send to the client device 102 to generate the camera user interface of the client application 104. The camera user interface system 132 may assemble the information related to the third-party application 106 that is to be used to generate the camera user interface of the client application 104 as modified camera user interface data 520 and send the modified camera user interface data 520 to the client device 102. The client application 104 may then use the modified camera user interface data 520 to generate a modified camera user interface 522 of the client application 104. In one or more examples, the camera user interface system 132 may direct another system, such as a system that is implemented and maintained by the third-party that provides the third-party application 106, to send information to the client device 102 for generating the modified camera user interface 522.

The modified camera user interface 522 may include content 524. The content 524 may include at least one of image content or video content that is captured in a field of view of at least one camera of the client device 102. For example, the content 524 may include live content that is being captured by at least one camera of the client device 102. In addition, the modified camera user interface 522 may include a group of user interface elements 526. The group of user interface elements 526 may include a number of user interface elements that are selectable to at least one of modify settings of a camera of the client device 102 or activate one or more tools that may be used to generate user content based on the content 524 (e.g., timer tool, grid tool). The modified camera user interface 522 may also include additional content 528. The additional content 528 may be related to the third-party application 106. In various examples, the additional content 528 may be related to content that is at least one of being consumed or being accessed by the third-party application 106 when the client application launch request 518 was made. In additional examples, at least a portion of the additional content 528 may include at least a portion of the third-party application information 506 provided by the developer device 108. Further, the modified camera user interface 522 may include a further user interface element 530. The further user interface element 530 may be selectable to generate user content based on the content 524. For example, the further user interface element 530 may be selectable to generate a photo that includes image content included in the content 524. In one or more additional examples, the further user interface element 530 may be selectable to generate a video that includes the content 524 captured over a period of time. In one or more illustrative examples, selection of the further user interface element 530 may cause data to be generated that persists for an amount of time that includes image data or video data generated by the client device 102 corresponding to the content 524.

In various examples, after user content has been generated in response to selection of the further user interface element 530, a subsequent user interface (not shown in FIG. 5) may be displayed. In one or more examples, the subsequent user interface may include user interface elements that are selectable to apply one or more creative tools to the user content. The one or more creative tools may apply at least one of text content, audio content, video content, or image content to the user content. The one or more creative tools may also modify the appearance of one or more objects included in the user content by applying one or more visual effects to the user content. The one or more creative tools may implement at least one of overlays, annotations, filters, or augmented reality content with respect to the user content. Further, the subsequent user interface may include one or more user interface elements that are selectable to distribute the user content or a modified version of the user content. In one or more illustrative examples, the user content or the modified version of the user content may be shared with one or more additional users of the client application 104, such as one or more users of the client application 104 that are included in a social network of the user 510.

In one or more implementations, the modified camera user interface 522 may be generated in relation to a default camera user interface 532. The default camera user interface 532 may be displayed via the client application 104 in situations where the client application 104 is not launched directly from the third-party application 106. That is, the default camera user interface 532 may be accessed while navigating through the client application 104 or when the client application 104 is launched via selection of an icon included in a group of icons displayed in a user interface of the client device 102, such as a home page of an operating system of the client device 102. The modified camera user interface 522 may be generated based on modifications to the default camera user interface 532, where the modifications are provided by one or more developers of the third-party application 106 in accordance with the camera user interface developer framework 502.

The default camera user interface 532 may include content 534 that includes at least one of image content or video content that is captured in a field of view of at least one camera of the client device 102. In various examples, the content 534 may correspond to the content 524. The default camera user interface 532 may also include the group of user interface elements 526 and the further user interface element 530. In one or more examples, the camera user interface developer framework 502 may indicate that one or more features of the default camera user interface 532 are to be preserved from the default camera user interface 532 to the modified camera user interface 522, such as the group of user interface elements 526 and the further user interface element 530.

The default camera user interface 532 may also include features that may be modified or removed by one or more developers of the third-party application 106. For example, the default camera user interface 532 may include a user interface element 536 that corresponds to search functionality of the client application 104. To illustrate, the user interface element 536 may be used to search for one or more additional users of the client application 104, such as one or more users of the client application 104 that are included in a social network of the user 510.

In addition, the default camera user interface 532 may include an additional group of user interface elements 538. The additional group of user interface elements 538 may include a first user interface element 540 that is selectable to access content provided by one or more sources of content. To illustrate, the first user interface element 540 may be selectable to access content related to contacts of the user 510, such as content of additional users of the client application 104 included in a social network of the user 510 or content of additional users of the client application 104 that are being followed by the user 510. The additional group of user interface elements 538 may also include a second user interface element 542. The second user interface element 542 may be selectable to invoke messaging functionality of the client application 104. In one or more examples, the second user interface element 542 may be selectable to generate a message that includes the content 534. Additionally, the additional group of user interface elements 538 may include a third user interface element 544. The third user interface element 544 may be selectable to access content of the user 510 that has been generated using the client application 104, such as at least one of image content or video content generated using the client application 104. The content generated using the client application 104 may be stored in association with an account of the user 510 with a service provider that at least one of implements or maintains the client application 104 via the server system 112. In one or more illustrative examples, the third user interface element 544 may be selectable to access a collection of content related to the user 510. Further, the additional group of user interface elements 538 may include a fourth user interface element 546. The fourth user interface element 546 may be selectable to search access augmented reality content items that may be applied to the content 534. Selection of the fourth user interface element 546 may cause a group of options that individually correspond to respective augmented reality content items to be displayed. Selection of an option of the group of options may cause the corresponding augmented reality content item to be applied to the content 534.

Figure 6:
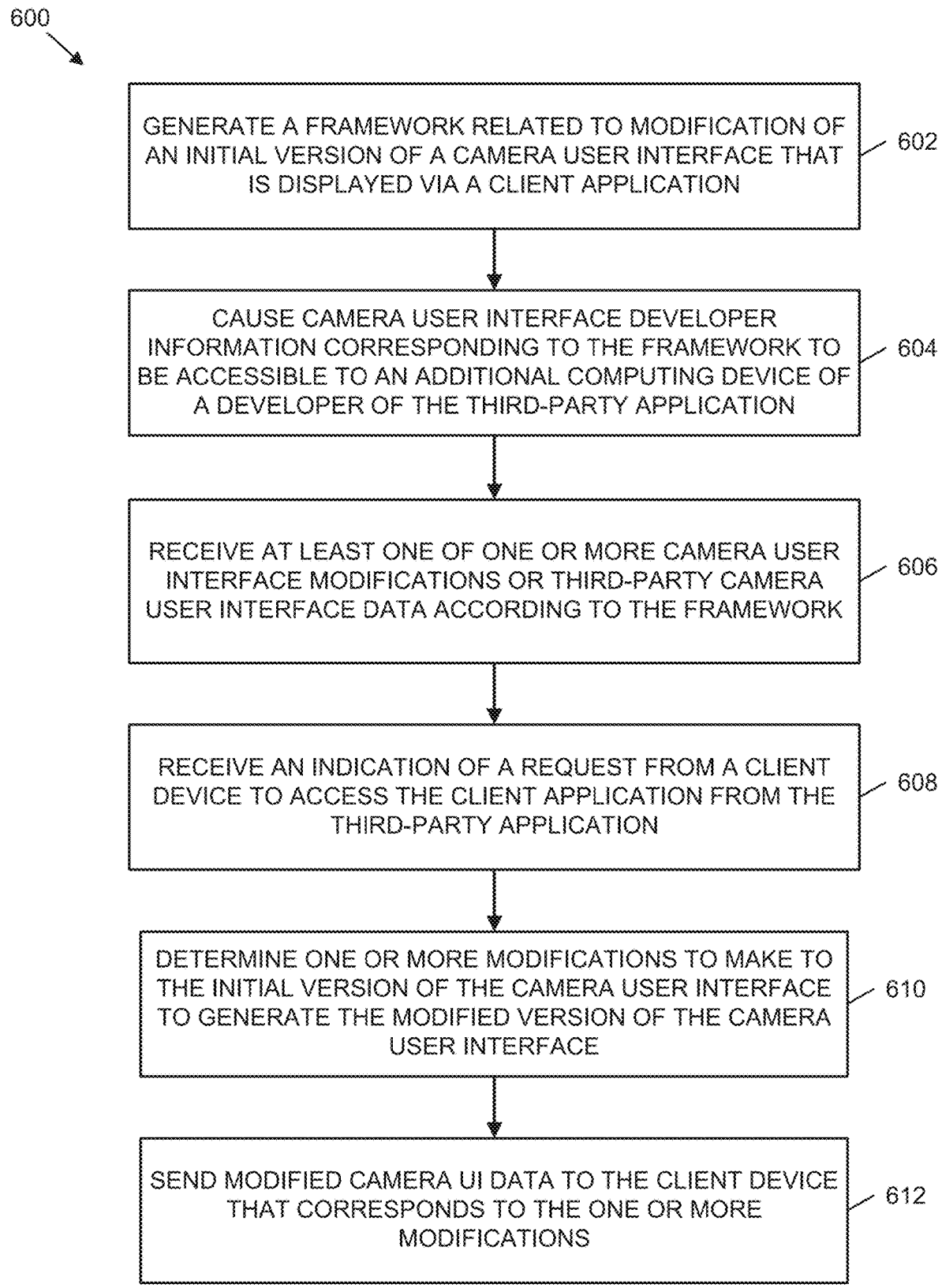
FIG. 6 is a flowchart illustrating example operations of a process to implement a framework used by third parties to modify a camera user interface of a client application, in accordance with one or more example implementations.
Figure 7:
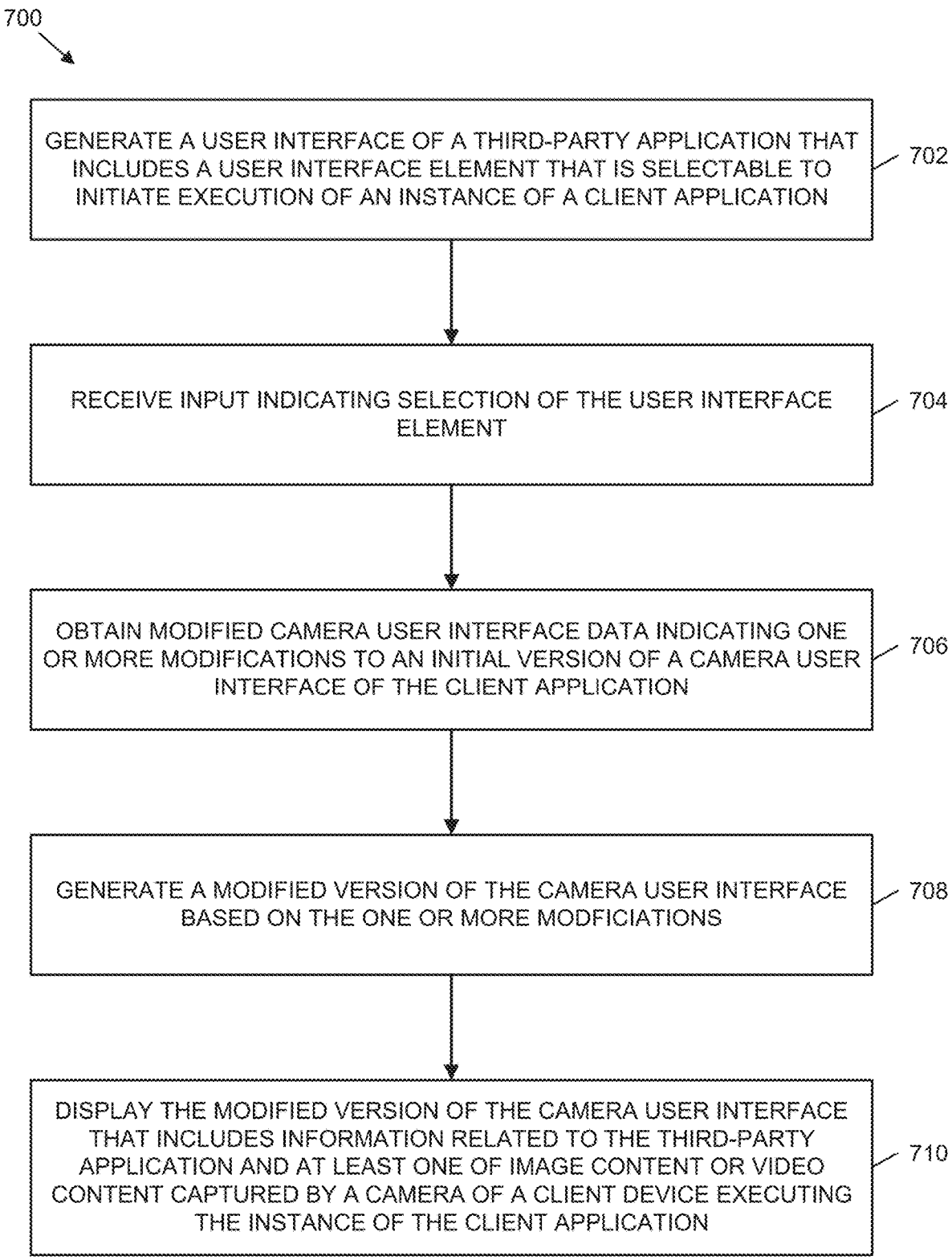
FIG. 7 is a flowchart illustrating example operations of a process to generate a modified camera user interface based on information obtained from third-party application developers, in accordance with one or more example implementations.

FIGS. 6 and 7 illustrates flowcharts of one or more implementations of a process to modify a camera user interface of a client application 104 based on content related to third-party applications 106. The processes may be embodied in computer-readable instructions for execution by one or more processors such that the operations of the processes may be performed in part or in whole by the functional components of at least one of the client application 104 or the server system 112. Accordingly, the processes described below are by way of example with reference thereto, in some situations. However, in other implementations, at least some of the operations of the processes described with respect to FIG. 6 and FIG. 7 may be deployed on various other hardware configurations. The processes described with respect to FIG. 6 and FIG. 7 are therefore not intended to be limited to the server system 112 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to implement a framework used by third parties to modify a camera user interface of a client application, in accordance with one or more example implementations. The process 600 may include, at operation 602, generating a framework related to modification of an initial version of a camera user interface that is displayed via a client application. The framework may provide at least one of parameters or features corresponding to modifications to a camera user interface. In one or more examples, the framework may include at least one of a software developer kit, computer-readable instructions, one or more application programming interfaces, or one or more rules for modification of the initial version of the camera user interface. In one or more illustrative examples, the initial version of the camera user interface may correspond to a default version of the camera user interface. Further, the framework may enable information to be passed from the third-party application to the client application and the client application may display the information or a modified version of information within the modified version of the camera user interface.

At operation 604, the process 600 may include causing camera user interface developer information corresponding to the framework to be accessible to an additional computing device of a developer of the third-party application. In various examples, the camera user interface developer information may be accessed via one or more user interfaces. The one or more user interfaces may include user interface elements that capture input related to the modification of an initial version of the camera user interface. In one or more examples, one or more user interfaces may capture first input to modify one or more user interface elements of the initial version of the camera user interface. For example, the first input may be directed to adding one or more user interface elements to the initial version of the camera user interface. The first input may also be directed to removing one or more user interface elements from the initial version of the camera user interface. The user interface elements included in the initial version of the camera user interface may be selectable to cause one or more operations supported by the client application to take place. The one or more user interfaces related to the framework may also capture second input to add content to the initial version of the camera user interface. To illustrate, the second input may correspond to adding content related to the third-party application to the initial version of the camera user interface. In one or more illustrative examples, content related to the third-party application that is added to the initial version of the camera user interface may correspond to content that is being at least one of displayed by or accessed by the third-party application.

In one or more implementations, the framework may indicate features of the initial version of the camera user interface that are unable to be removed from the initial version of the camera user interface. That is, the framework may include one or more restrictions with respect to features included in the initial version of the camera user interface. In one or more examples, the framework may indicate at least one of one or more user interface elements of the initial version of the camera user interface that may be modified or one or more user interface elements of the initial version of the camera user interface that may not be modified. In various examples, the framework may enable developers of the third-party application to specify a layout of features included in the modified version of the camera user interface. To illustrate, the framework may enable one or more locations of features included in the initial version of the camera user interface to be changed Additionally, the framework may enable developers of third-party applications to specify locations within the modified version of the camera user interface for features added to the initial version of the camera user interface.

In addition, at operation 606, the process 600 may include receiving, from the additional computing device of the developer, at least one of one or more camera user interface modifications or third-party camera user interface data according to the framework. In one or more examples, developers of third-party applications may utilize user interfaces that correspond to the framework to make modifications to the initial version of the camera user interface. The modifications may be stored in one or more databases. In various examples, the modifications may be stored in association with an identifier of the third-party application. In this way, in situations where the client application is launched from the third-party application, the modifications related to the third-party application may be retrieved and used to generate the modified version of the camera user interface that is displayed when the client application is launched from the third-party application.

Further, at operation 608, the process 600 may include receiving an indication of a request from a client device to access the client application from the third-party application. The indication may be provided in response to selection of a user interface element in a user interface of the third-party application. For example, a user of the third-party application may select the user interface element. The indication may include an identifier of the third-party application. Additionally, the indication may include an identifier of a user of the third-party application.

The process 600 may include, at operation 610, determining one or more modifications to make with respect to the initial version of the camera user interface to generate the modified version of the camera user interface. In one or more examples, an identifier of the third-party application may be used to query one or more databases that include information about modifications to the initial version of the camera user interface by developers of third-party applications using the camera user interface developer framework. In this way, modifications to the initial version of the camera user interface that correspond to the third-party application may be applied to generate the modified version of the camera user interface. In various examples, content related to the third-party application may be obtained and used to generate the modified version of the camera user interface. In one or more illustrative examples, a uniform resource indicator corresponding to content related to the third-party application may be retrieved and used to obtain the third-party application content. In one or more additional examples, user interface elements related to the modified version of the modified version of the camera user interface that is associated with the third-party application may also be identified. In one or more further examples, a layout of user interface elements and content may be determined. In still further examples, content that is at least one of being displayed or accessed by the third-party application when the input was made to launch the client application from the client application may be identified and information related to the content may be used to generate the modified version of the camera user interface.

At 612, the process 600 may include sending, to the client device that is launching the client application from the third-party application, modified camera user interface data that corresponds to the one or more modifications of the initial version of the camera user interface. The client device may then analyze the modified camera user interface data and implement the modified camera user interface data to display the modified version of the camera user interface.

FIG. 7 is a flowchart illustrating example operations of a process 700 to generate a modified camera user interface based on information obtained from third-party application developers, in accordance with one or more example implementations. At operation 702, the process 700 may include generating a user interface of a third-party application that includes a user interface element that is selectable to initiate execution of an instance of the client application. In various examples, developers of third-party applications may provide access to the client application from the third-party application by adding a user interface element to one or more user interfaces of the third-party application that causes the client application to be launched.

Additionally, at operation 704, the process 700 may include receiving input indicating selection of the user interface element. In one or more examples, in response to selection of the user interface element, at least one request may be sent to a service provider to obtain information that may be used to render and display a camera user interface element of the client application. In one or more examples, selection of the user interface element may cause a uniform resource indicator to be identified that corresponds to a target user interface that is generated when the client application is launched. In one or more illustrative examples, the target user interface may include a camera user interface of the client application that displays, in part, a field of view of at least one camera of a client device. In one or more additional examples, in response to selection of the user interface element, information related to content of the third-party application that was at least one of being displayed or accessed via the third-party application may be identified and passed to the client application. The client application may use the third-party application content to generate at least a portion of the camera user interface.

The process 700 may include, at operation 706, obtaining modified camera user interface data indicating one or more modifications to an initial version of a camera user interface of the client application. The modified camera user interface data may indicate user interface elements that are to be included in a modified version of the camera user interface that is associated with the third-party application. The modified camera user interface data may also indicate a layout of features of the modified version of the camera user interface. Further, the modified camera user interface data may indicate information related to the third-party application that may be displayed in the modified version of the camera application, such as an identifier of the third-party application or information corresponding to content that is at least one of displayed by or accessible to the third-party application.

At operation 708, the process 700 may include generating a modified version of the camera user interface based on the one or more modifications. Further, at operation 710, the process 700 may include displaying the modified version of the camera user interface that includes information related to the third-party application and at least one of image content or video content captured by a camera of a client device executing the instance of the client application. In one or more examples, the modified version of the camera user interface may include one or more user interface elements to modify the at least one of image content or video content shown in the modified version of the camera user interface. For example, the modified version of the camera user interface may include one or more user interface elements that are selectable to apply one or more augmented reality content items to the at least one of image content or video content. In one or more additional examples, the modified version of the camera user interface may include one or more user interface elements to create user content, such as image content or video content, that includes content captured in the field of view of the camera and that also includes content related to the third-party application. The user content may be shared with additional users of the client application. The user content may also be included in a message that may be sent to one or more recipients. In various examples, information related to the third-party application may be edited by a user of the client application before generating the user content and distributing the user content via the client application. To illustrate, an identifier of the third-party application may be removed from the content displayed in the modified version of the camera user interface before generating user content that is to be distributed via the client application.

Figure 8:
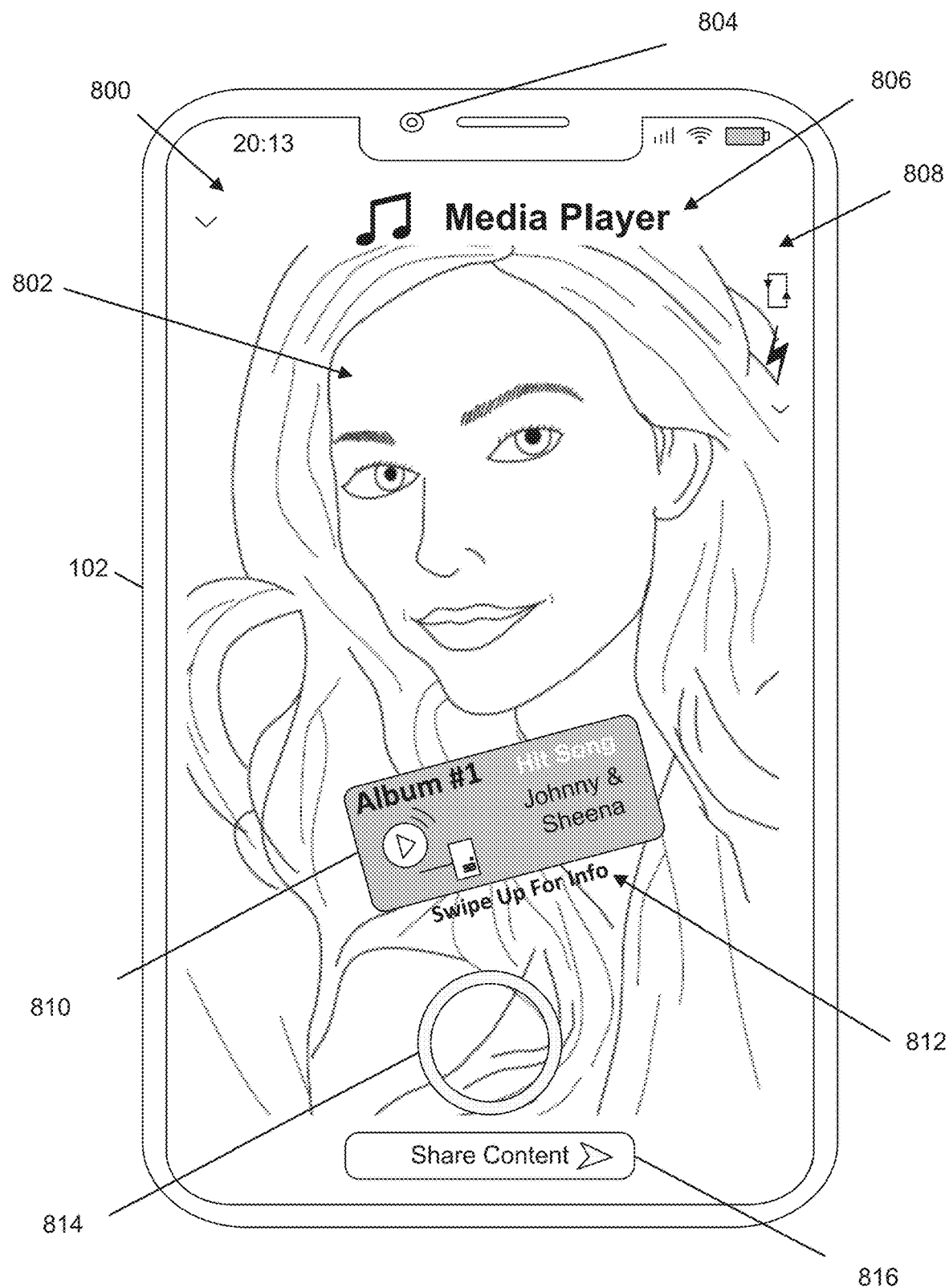
FIG. 8 is an illustration of a user interface showing a view of a camera and that is formatted according to a framework used by a developer of a third-party application to include content from the third-party into the user interface, according to one or more example implementations.

FIG. 8 is an illustration of a user interface 800 showing a view of a camera and that is formatted according to a framework used by a developer of a third-party application to include content from the third-party into the user interface, according to one or more example implementations. The user interface 800 may be displayed via a display device of the client device 102 and produced by a client application executed by the client device 102, such as the client application 104. The user interface 800 may be displayed in response to launching the client application 104 from a third-party application 106. In the illustrative example of FIG. 8, the third-party application 106 may include a media player application. In one or more examples, the user interface 800 may include a modified version of a camera user interface of the client application 104 that has been designed by one or more developers of the media player application using a framework provided by a service provider related to the client application 104.

The user interface 800 may include a layout of information and user interface elements with respect to a modified version of the camera user interface of the client application 104 that is designed by one or more developers of the third-party application 106. For example, the user interface 800 may include field of view content 802 that is being captured within a field of view of a camera 804 of the client device 102. In addition, the user interface 800 may include an identifier 806 of the media player application. In one or more examples, the identifier 806 may correspond to third-party application information that is provided by a developer of the media player application. The user interface 800 may also include a group of user interface elements 808. The group of user interface elements 808 may include a number of user interface elements that are selectable to implement various actions related to generating user content from the field of view content 802, such as capturing at least one of image content or video content based on the field of view content 802. In one or more examples, the group of user interface elements 808 may include a user interface element to rotate the view of the field of view content 802, such as from a portrait view to a landscape view or from a landscape view to a portrait view. Additionally, the group of user interface elements 808 may include a user interface element to modify flash settings of the camera 804, a user interface element to implement a timer with respect to capturing content within the field of view of the camera 804, and a user interface element that is selectable to add a grid to the user interface 800, among others. In one or more examples, a camera user interface developer framework may specify that the group of user interface elements 808 are not removable from the user interface 800.

Further, the user interface 800 may include additional third-party information 810 that indicates media content that was at least one of being consumed by or accessible to the third-party media player application from which the client application 104 was launched. In the illustrative example of FIG. 8, the additional third-party information 810 may include information related to a song that was being played by the media player application when the client application 104 was launched. In various examples, the song may continue to play while the media player application operates in the background as a user of the client application 104 interacts with the user interface 800. The additional third-party information 810 may be displayed based on data that is passed from the media player application to the client application 104 that indicates a name of the song, an artist related to the song, an album related to the song, and a graphic that is related to the song. In one or more examples, one or more developers of the media player application may use the camera user interface developer framework to specify the location and the appearance of the additional third-party information 810. The user interface 800 may also include instructions 812 that indicate functionality related to the additional third-party information 810. To illustrate, the additional third-party information 810 may correspond to a user interface element that may be swiped up in order to display further information about the song played by the media player application from which the client application 104 was launched.

In one or more implementations, the user interface 800 may also include a user interface element 814 that is selectable to create user content that includes at least one of image content or video content that is shown in a field of view of the camera 804. In one or more examples, selection of the user interface element 814 may cause content shown in the user interface 800 to persist for a period of time to create the user content. In various examples, the user content may be stored in at least one of memory of the client device 102 or a remote storage location. In addition, the user interface 800 may include a user interface element 816 that is selectable to share the user content created based on the field of view content 802. In one or more scenarios, the user content may be shared by sending a message that includes content captured in the field of view of the camera 804. The message may also include information about the media player application. In one or more illustrative examples, the message may include a user interface element that is selectable by one or more recipients of the message to launch the media player application and play the song corresponding to the additional third-party information 810. In one or more additional examples, the user interface element 816 may be selectable to make the user content accessible to one or more users of the client application 104 that are included in a social network of the user of the client application 104 that is generating the user content based on at least one of the field of view content 802 or the third-party application information included in the user interface 800.

Figure 9:
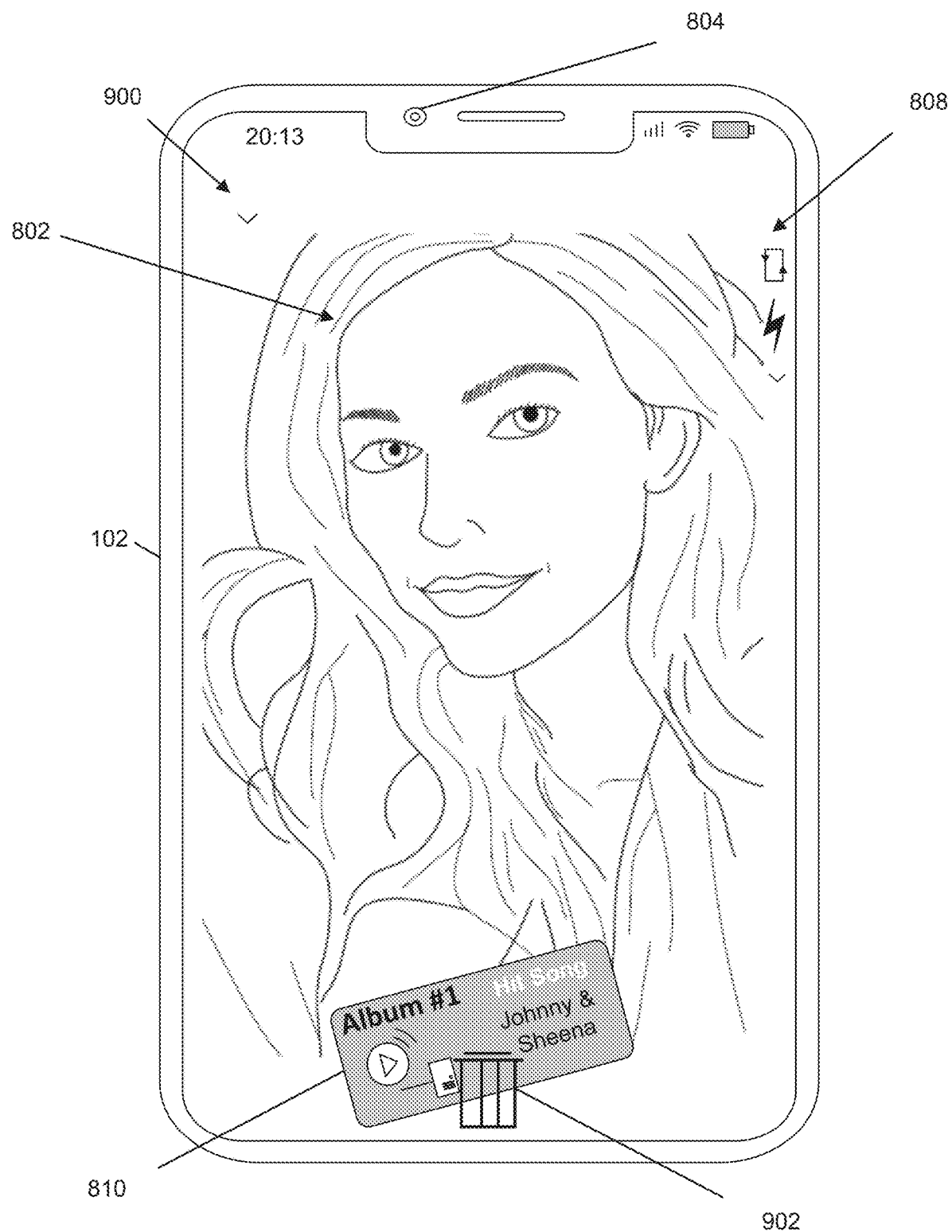
FIG. 9 is an illustration of a user interface showing a view of a camera and that enables a user of a client application to modify third-party content included in the user interface, according to one or more example implementations.

FIG. 9 is an illustration of a user interface 900 showing a view of a camera and that enables a user of a client application to modify third-party content included in the user interface, according to one or more example implementations. The user interface 900 may be displayed via a display device of the client device 102 and produced by a client application executed by the client device 102, such as the client application 104. In various examples, the user interface 900 may be displayed after the user interface 800 or may include a modified version of the user interface 800 after selection of a user interface element to modify the content included in the user interface 800. In the illustrative example of FIG. 9, the user interface 900 may include a user interface element 902 that may be implemented to remove content from the user interface 800. For example, the user interface element 902 may be used remove the additional third-party information 810 from the user interface 800. In this way, a user of the client application 104 may generate user content that does not include the additional third-party information 810.

Figure 10:
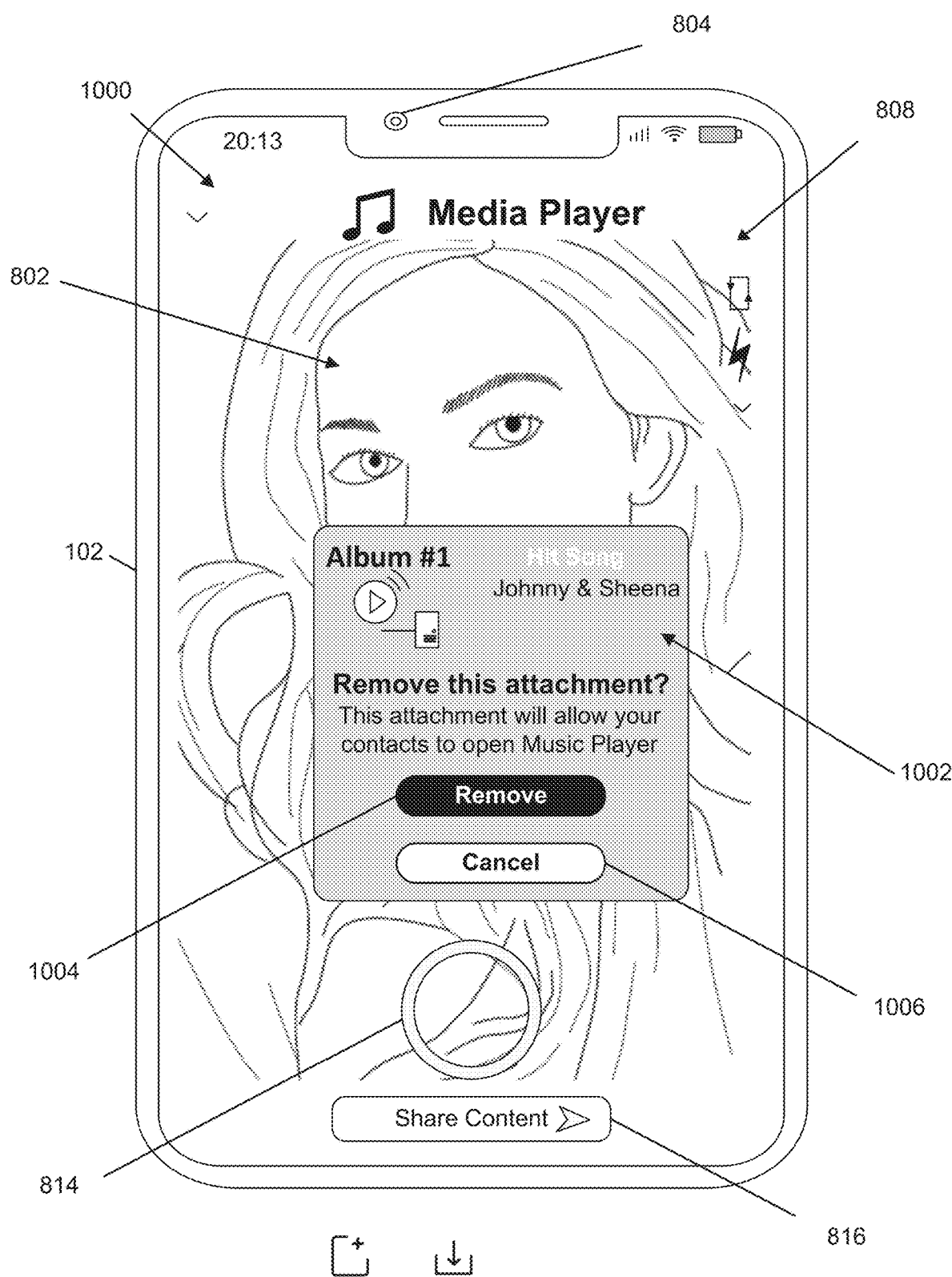
FIG. 10 is an illustration of an additional user interface showing a view of a camera and that enables a user of a client application to modify third-party content included in the user interface, according to one or more example implementations.

FIG. 10 is an illustration of an additional user interface 1000 showing a view of a camera and that enables a user of a client application to modify third-party content included in the user interface, according to one or more example implementations. The user interface 1000 may be displayed via a display device of the client device 102 and produced by a client application executed by the client device 102, such as the client application 104. The user interface 1000 may include a user interface element 1002 that may be displayed in response to selection of a user interface element to share user content that is generated based on the field of view content 802 or a user interface element that is selectable to modify a message or social networking post related to the user content. In the illustrative example of FIG. 10, the user interface element 1002 may include instructions for removing a link from a message or from a social networking post, where the link enables a recipient of the message or a user of the client application 104 viewing the social networking post to launch the third-party media player application. The user interface element 1002 may include a first additional user interface element 1004 that is selectable to remove the link from the message or the social networking post and a second additional user interface element 1006 that is selectable to remove the user interface element 1002 and cancel any actions related to the deletion of the link from the message or social networking post.

Figure 11:
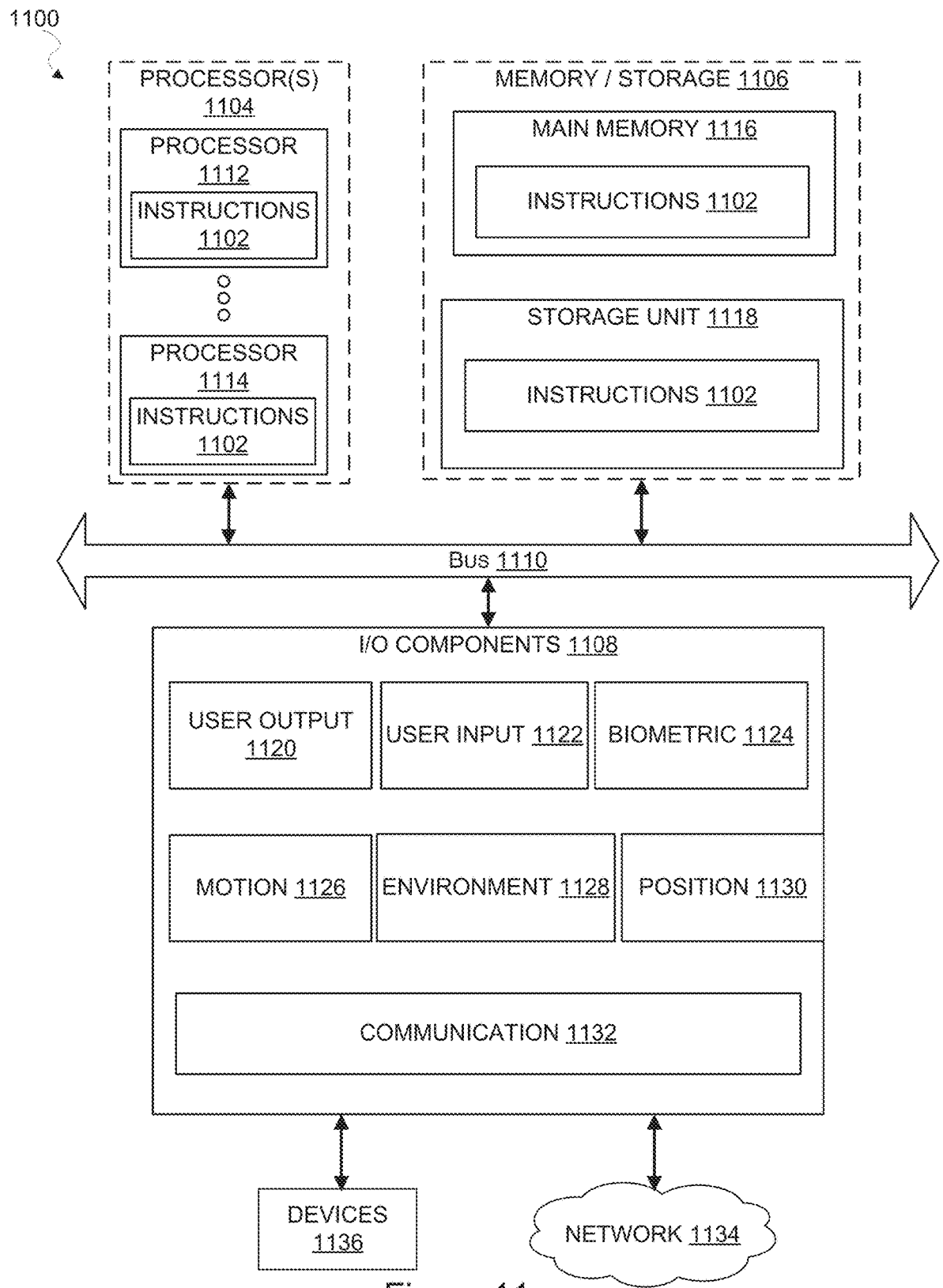
FIG. 11 is a block diagram illustrating components of a machine, in the form of a computer system, that may read and execute instructions from one or more machine-readable media to perform any one or more methodologies described herein, in accordance with one or more example implementations.

FIG. 11 is a block diagram illustrating components of a machine 1100, according to some example implementations, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1102 (e.g., software, a program, an application, an applet, an app, or other executable code) for causing the machine 1100 to perform any one or more of the methodologies discussed herein may be executed. As such, the instructions 1102 may be used to implement modules or components described herein. The instructions 1102 transform the general, non-programmed machine 1100 into a particular machine 1100 programmed to carry out the described and illustrated functions in the manner described. In alternative implementations, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1102, sequentially or otherwise, that specify actions to be taken by machine 1100. Further, while only a single machine 1100 is illustrated, the term "machine" shall also be taken to include a collection of machines that individually or jointly execute the instructions 1102 to perform any one or more of the methodologies discussed herein.

The machine 1100 may include processors 1104, memory/storage 1106, and I/O components 1108, which may be configured to communicate with each other such as via a bus 1110. In an example implementation, the processors 1104 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1102. The term "processor" is intended to include multi-core processors 1104 that may comprise two or more independent processors (sometimes referred to as "cores") that may execute instructions 1102 contemporaneously. Although FIG. 11 shows multiple processors 1104, the machine 1100 may include a single processor 1112 with a single core, a single processor 1112 with multiple cores (e.g., a multi-core processor), multiple processors 1112, 1114 with a single core, multiple processors 1112, 1114 with multiple cores, or any combination thereof.

The memory/storage 1106 may include memory, such as a main memory 1116, or other memory storage, and a storage unit 1118, both accessible to the processors 1104 such as via the bus 1110. The storage unit 1118 and main memory 1116 store the instructions 1102 embodying any one or more of the methodologies or functions described herein. The instructions 1102 may also reside, completely or partially, within the main memory 1116, within the storage unit 1118, within at least one of the processors 1104 (e.g., within the processor's cache memory), or any suitable combination thereof, during execution thereof by the machine 1100. Accordingly, the main memory 1116, the storage unit 1118, and the memory of processors 1104 are examples of machine-readable media.

The I/O components 1108 may include a wide variety of components to receive input, provide output, produce output, transmit information, exchange information, capture measurements, and so on. The specific I/O components 1108 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1108 may include many other components that are not shown in FIG. 10. The I/O components 1108 are grouped according to functionality merely for simplifying the following discussion and the grouping is in no way limiting. In various example implementations, the I/O components 1108 may include user output components 1120 and user input components 1122. The user output components 1120 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1122 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1108 may include biometric components 1124, motion components 1126, environmental components 1128, or position components 1130 among a wide array of other components. For example, the biometric components 1124 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1126 may include acceleration sensor components (e.g., accelerometer), gravitation sensor components, rotation sensor components (e.g., gyroscope), and so forth. The environmental components 1128 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1130 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 may include communication components 1132 operable to couple the machine 1100 to a network 1134 or devices 1136. For example, the communication components 1132 may include a network interface component or other suitable device to interface with the network 1134. In further examples, communication components 1132 may include wired communication components, wireless communication components, cellular communication components, near field communication (NFC) components. Bluetooth® components (e.g., Bluetooth® Low Energy), Wi-Fi® components, and other communication components to provide communication via other modalities. The devices 1136 may be another machine 1100 or any of a wide variety of peripheral devices (e.g., a peripheral device coupled via a USB).

Moreover, the communication components 1132 may detect identifiers or include components operable to detect identifiers. For example, the communication components 1132 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1132, such as location via Internet Protocol (IP) geo-location, location via Wi-Fi® signal triangulation, location via detecting an NFC beacon signal that may indicate a particular location, and so forth.

Figure 12:
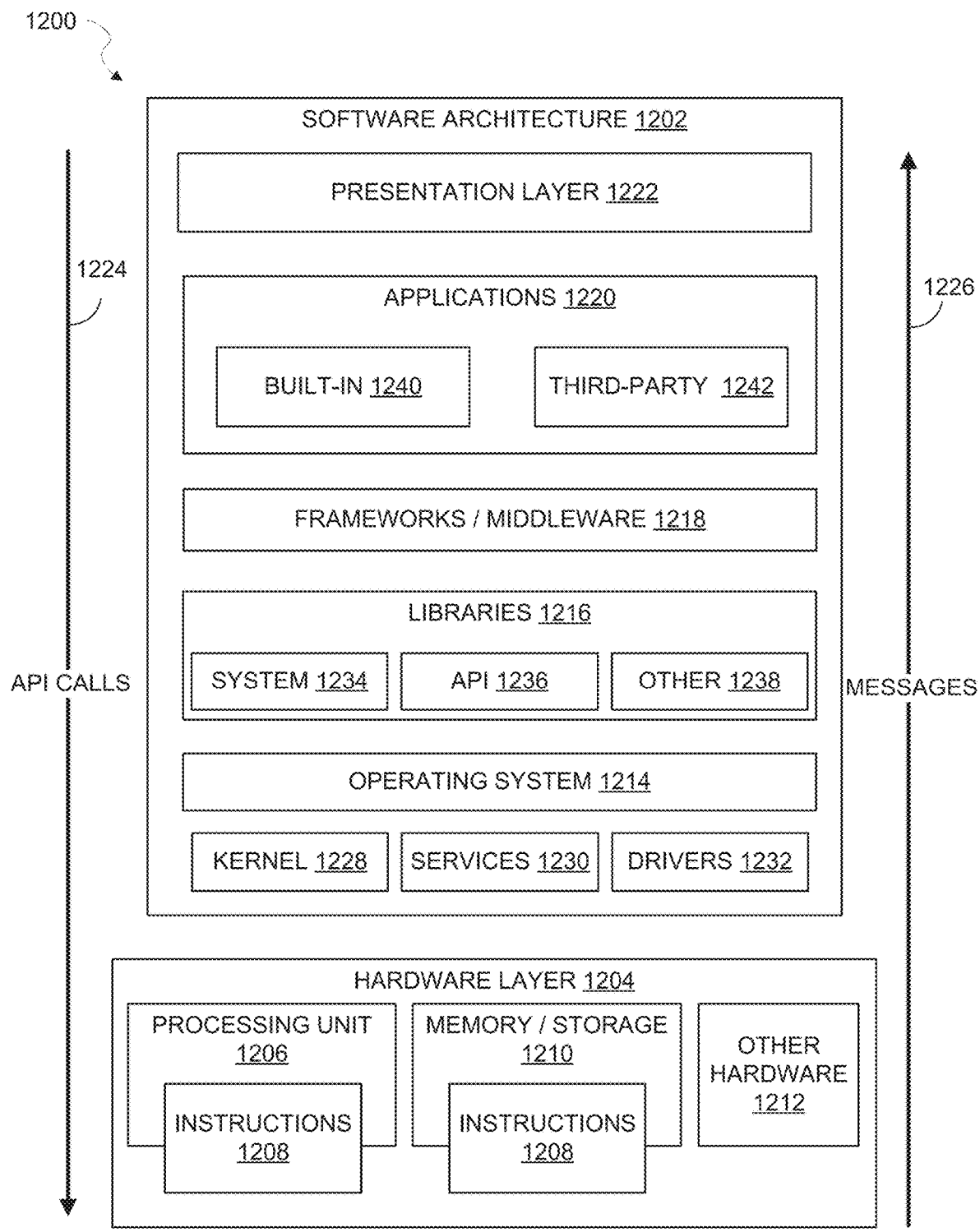
FIG. 12 is block diagram illustrating a representative software architecture that may be used in conjunction with one or more hardware architectures described herein, in accordance with one or more example implementations.

FIG. 12 is a block diagram illustrating system 1200 that includes an example software architecture 1202, which may be used in conjunction with various hardware architectures herein described. FIG. 12 is a non-limiting example of a software architecture and it will be appreciated that many other architectures may be implemented to facilitate the functionality described herein. The software architecture 1202 may execute on hardware such as machine 1100 of FIG. 11 that includes, among other things, processors 1104, memory/storage 1106, and input/output (I/O) components 1108. A representative hardware layer 1204 is illustrated and can represent, for example, the machine 1100 of FIG. 11. The representative hardware layer 1204 includes a processing unit 1206 having associated executable instructions 1208. Executable instructions 1208 represent the executable instructions of the software architecture 1202, including implementation of the methods, components, and so forth described herein. The hardware layer 1204 also includes at least one of memory or storage modules memory/storage 1210, which also have executable instructions 1208. The hardware layer 1204 may also comprise other hardware 1212.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1222. Operationally, the applications 1220 or other components within the layers may invoke API calls 1224 through the software stack and receive messages 1226 in response to the API calls 1224. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 are responsible for controlling or interfacing with the underlying hardware. For instance, the drivers 1232 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 provide a common infrastructure that is used by at least one of the applications 1220, other components, or layers. The libraries 1216 provide functionality that allows other software components to perform tasks in an easier fashion than to interface directly with the underlying operating system 1214 functionality (e.g., kernel 1228, services 1230, drivers 1232). The libraries 1216 may include system libraries 1234 (e.g., C standard library) that may provide functions such as memory allocation functions, string manipulation functions, mathematical functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks/middleware 1218 (also sometimes referred to as middleware) provide a higher-level common infrastructure that may be used by the applications 1220 or other software components/modules. For example, the frameworks/middleware 1218 may provide various graphical user interface functions, high-level resource management, high-level location services, and so forth. The frameworks/middleware 1218 may provide a broad spectrum of other APIs that may be utilized by the applications 1220 or other software components/modules, some of which may be specific to a particular operating system 1214 or platform.

The applications 1220 include built-in applications 1240 and third-party applications 1242. Examples of representative built-in applications 1240 may include, but are not limited to, a contacts application, a browser application, a book reader application, a location application, a media application, a messaging application, or a game application. Third-party applications 1242 may include an application developed using the ANDROID™ or IOS™ software development kit (SDK) by an entity other than the vendor of the particular platform, and may be mobile software running on a mobile operating system such as IDS™, ANDROID™, WINDOWS® Phone, or other mobile operating systems. The third-party applications 1242 may invoke the API calls 1224 provided by the mobile operating system (such as operating system 1214) to facilitate functionality described herein.

The applications 1220 may use built-in operating system functions (e.g., kernel 1228, services 1230, drivers 1232), libraries 1216, and frameworks/middleware 1218 to create UIs to interact with users of the system. Alternatively, or additionally, in some systems, interactions with a user may occur through a presentation layer, such as presentation layer 1222. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 1102 for execution by the machine 1100, and includes digital or analog communications signals or other intangible medium to facilitate communication of such instructions 1102. Instructions 1102 may be transmitted or received over the network 114, 1134 using a transitory or non-transitory transmission medium via a network interface device and using any one of a number of well-known transfer protocols.

"CLIENT DEVICE," in this context, refers to any machine 1100 that interfaces to a communications network 114, 1134 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 114, 1134.

"COMMUNICATIONS NETWORK," in this context, refers to one or more portions of a network 114, 1134 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 114, 1134 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1102 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 1102. The term "machine-readable medium" shall also be taken to include any medium, or combination of multiple media, that is capable of storing instructions 1102 (e.g., code) for execution by a machine 1100, such that the instructions 1102, when executed by one or more processors 1104 of the machine 1100, cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1104 or other programmable processor. Once configured by such software, hardware components become specific machines (or specific components of a machine 1100) uniquely tailored to perform the configured functions and are no longer general-purpose processors 1104. It will be appreciated that the decision to implement a hardware component mechanically, in dedicated and permanently configured circuitry, or in temporarily configured circuitry ((e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1104 configured by software to become a special-purpose processor, the general-purpose processor 1104 may be configured as respectively different special-purpose processors (e.g., comprising different hardware components) at different times. Software accordingly configures a particular processor 1112, 1114 or processors 1104, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1104 that are temporarily configured (e.g., by software) car permanently configured to perform the relevant operations. Whether temporarily or permanently configured, such processors 1104 may constitute processor-implemented components that operate to perform one or more operations or functions described herein. As used herein, "processor-implemented component" refers to a hardware component implemented using one or more processors 1104. Similarly, the methods described herein may be at least partially processor-implemented, with a particular processor 1112, 1114 or processors 1104 being an example of hardware. For example, at least some of the operations of a method may be performed by one or more processors 1104 or processor-implemented components. Moreover, the one or more processors 1104 may also operate to support performance of the relevant operations in a "cloud computing" environment or as a "software as a service" (SaaS). For example, at least some of the operations may be performed by a group of computers (as examples of machines 1100 including processors 1104), with these operations being accessible via a network 114 (e.g., the Internet) and via one or more appropriate interfaces (e.g., an API). The performance of certain of the operations may be distributed among the processors, not only residing within a single machine 1100, but deployed across a number of machines. In some example implementations, the processors 1104 or processor-implemented components may be located in a single geographic location (e.g., within a home environment, an office environment, or a server farm). In other example implementations, the processors 1104 or processor-implemented components may be distributed across a number of geographic locations.

"PROCESSOR," in this context, refers to any circuit or virtual circuit (a physical circuit emulated by logic executing on an actual processor 1104) that manipulates data values according to control signals (e.g., "commands," "op codes," "machine code," etc.) and which produces corresponding output signals that are applied to operate a machine 1100. A processor 1104 may, for example, be a CPU, a RISC processor, a CISC processor, a GPU, a DSP, an ASIC, a RFIC or any combination thereof. A processor 1104 may further be a multi-core processor having two or more independent processors 1104 (sometimes referred to as "cores") that may execute instructions 1102 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:
    generating, by one or more computing devices, a framework related to modification of an initial version of a camera user interface that is displayed via a client application, wherein the framework includes at least one of rules, software code, a software developer kit, or one or more application programming interfaces to generate customized versions of the camera user interface based on the initial version of the camera user interface;
    causing, by at least one computing device of the one or more computing devices, camera user interface developer information corresponding to the framework to be accessible to an additional computing device of a developer of a third-party application;
    receiving, by at least one computing device of the one or more computing devices and from the additional computing device of the developer of the third-party application, at least one of one or more camera user interface modifications or third-party camera user interface data from the additional computing device of the developer, the one or more camera user interface modifications indicating at least one modification to the initial version of the camera user interface and the third-party camera user interface data corresponding to information related to the third-party application to display via a modified version of the camera user interface that is customized in relation to the developer of the third-party application;
    determining, by at least one computing device of the one or more computing devices, that a client device of a user of the client application has launched an instance of the client application from the third-party application, wherein the user of the client application is different from the developer of the third-party application;
    responsive to determining that the client device has launched the instance of the client application from the third-party application, generating, by at least one computing device of the one or more computing devices, modified camera user interface data, the modified camera user interface data corresponding to the modified version of the camera user interface that includes user content and the information related to the third-party application; and
    sending, by at least one computing device of the one or more computing devices, the modified camera user interface data to the client device.

2. The method of claim 1, further comprising:
    storing, by at least one computing device of the one or more computing devices, at least one of the one or more camera user interface modifications or the third-party camera user interface data in one or more databases in association with an identifier of the third-party application;
    determining, by at least one computing device of the one or more computing devices, that the identifier of the third-party application is included in a request to launch the client application from the third-party application; and
    querying, by at least one computing device of the one or more computing devices, one or more databases based on the identifier to retrieve at least one of the one or more camera user interface modifications or the third-party camera user interface data.

3. The method of claim 2, further comprising:
    determining, by at least one computing device of the one or more computing devices and based on the third-party camera user interface data, a uniform resource indicator of content corresponding to the third-party application; and
    retrieving, by at least one computing device of the one or more computing devices, the content according to the uniform resource indicator; and
    wherein the modified camera user interface data includes the content.

4. The method of claim 1, further comprising:
    obtaining, by at least one computing device of the one or more computing devices, content from the third-party application to include in the modified version of the camera user interface; and
    sending, by at least one computing device of the one or more computing devices, the content to the client device.

5. The method of claim 1, further comprising:
    receiving, by at least one computing device of the one or more computing devices, a message from a user of the client application to one or more recipients, the message including at least one of image content or video content captured via at least one camera of the client device and at least a portion of the information related to the third-party application displayed in the modified version of the camera user interface; and
    sending, by at least one computing device of the one or more computing devices, the message to one or more additional client devices of the one or more recipients.

6. The method of claim 1, further comprising:
    adding, by at least one computing device of the one or more computing devices, content to a collection of content of a user of the client application, wherein the content includes at least one of image content or video content captured via at least one camera of the client device and at least a portion of the information related to the third-party application displayed in the modified version of the camera user interface; and
    providing, by at least one computing device of the one or more computing devices, access to the content by a number of users of the client application.

7. The method of claim 1, wherein the initial version of the camera user interface includes a plurality of user interface elements and the one or more camera user interface modifications include at least one of adding a first user interface element to the plurality of user interface elements or removing a second user interface element from the plurality of user interface elements.

8. The method of claim 7, wherein the camera user interface developer information indicates that at least a portion of the plurality of user interface elements are unable to be removed from the initial version of the camera user interface.

9. The method of claim 1, wherein the one or more camera user interface modifications indicate one or more locations within the modified version of the camera user interface for the information related to the third-party application to be placed.

10. The method of claim 1, further comprising:
receiving, by at least one computing device of the one or more computing devices, an indication to apply an augmented reality content item to at least one of image content or video content displayed in the modified version of the camera user interface; and
causing, by at least one computing device of the one or more computing devices, an appearance of one or more objects included in at least one of the image content or the video content to be modified based on applying the augmented reality content item to the at least one of image content or video content.

11. A system comprising:
one or more hardware processors; and
one or more non-transitory computer-readable storage media including computer-readable instructions that, when executed by the one or more hardware processors, cause the one or more hardware processors to perform operations comprising:
generating a framework related to modification of an initial version of a camera user interface that is displayed via a client application, wherein the framework includes at least one of rules, software code, a software developer kit, or one or more application programming interfaces to generate customized versions of the camera user interface based on the initial version of the camera user interface;
causing camera user interface developer information corresponding to the framework to be accessible to an additional computing device of a developer of a third-party application;
receiving, from the additional computing device of the developer of the third-party application, at least one of one or more camera user interface modifications or third-party camera user interface data from the additional computing device of the developer, the one or more camera user interface modifications indicating at least one modification to the initial version of the camera user interface and the third-party camera user interface data corresponding to information related to the third-party application to display via a modified version of the camera user interface;
determining that a client device of a user of the client application has launched an instance of the client application from the third-party application, wherein the user of the client application is different from the developer of the third-party application;
responsive to determining that the client device has launched the instance of the client application from the third-party application, generating modified camera user interface data, the modified camera user interface data corresponding to the modified version of the camera user interface that includes user content and the information related to the third-party application; and
sending the modified camera user interface data to the client device.

12. The system of claim 11, wherein the one or more camera user interface modifications are received from the additional computing device and indicate at least one of changes to a layout of information included in the initial version of the camera user interface or operations to be performed with respect to the user content.

13. The system of claim 11, wherein the one or more non-transitory computer-readable storage media include additional computer-readable instructions that, when executed by the one or more hardware processors, cause the one or more hardware processors to perform additional operations comprising:
generating user interface data corresponding to one or more user interfaces that capture at least one of first input to modify one or more user interface elements included in the initial version of the camera user interface or second input to add content to the initial version of the camera user interface; and
sending the user interface data to the additional computing device of the developer.

14. The system of claim 13, wherein the one or more non-transitory computer-readable storage media include additional computer-readable instructions that, when executed by the one or more hardware processors, cause the one or more hardware processors to perform additional operations comprising:
receiving data from the additional computing device of the developer, the data being captured via the one or more user interfaces and indicating one or more modifications to make with respect to the modified version of the camera user interface, the one or more modifications including at least one of one or more first user interface elements to add to the initial version of the camera user interface, one or more second user interface elements to remove from the initial version of the camera user interface, or the information related to the third-party application that is to be displayed via the modified version of the camera user interface; and
generating the modified camera user interface data based on one or more modifications.

15. A method comprising:
generating, by one or more computing devices, a user interface of a third-party application that includes a user interface element that is selectable to initiate execution of an instance of a client application;
receiving, by at least one computing device of the one or more computing devices, input indicating selection of the user interface element;
responsive to determining that the instance of the client application has launched from the third-party application, generating, by at least one computing device of the one or more computing devices, modified camera user interface data indicating one or more modifications to an initial version of a camera user interface of the client application;
generating, by at least one computing device of the one or more computing devices, a modified version of the camera user interface based on the one or more modifications; and
displaying, by at least one computing device of the one or more computing devices, the modified version of the camera user interface that includes information related to the third-party application and at least one of image content or video content captured by a camera of a client device executing the instance of the client application, wherein the information related to the third-party application is arranged according to a customized layout of the camera user interface and includes an identifier of the third-party application and additional information related to the third-Party application.

16. The method of claim 15, further comprising:

determining, by at least one computing device of the one or more computing devices, a uniform resource indicator in response to selection of the user interface element, the uniform resource indicator corresponding to the camera user interface of the client application; and navigating, by at least one computing device of the one or more computing devices, to the modified version of the camera user interface based on the uniform resource indicator.

17. The method of claim 15, further comprising:

receiving, by at least one computing device of the one or more computing devices, user input to remove at least a portion of the information related to the third-party application from the modified version of the camera user interface; and generating, by at least one computing device of the one or more computing devices, content that includes at least one of the image content or the video content captured by the camera of the client device and excludes that at least a portion of the information related to the third-party application.

18. The method of claim 15, further comprising:

determining, by at least one computing device of the one or more computing devices, third-party content being at least one of displayed or accessed by the third-party application when the user interface element is selected; and wherein the information related to the third-party application that is displayed in the modified version of the camera user interface corresponds to the third-party content.

19. The method of claim 15, further comprising:

generating, by at least one computing device of the one or more computing devices, user content that includes at least one of the image content or the video content captured by the camera of the client device and at least a portion of the information related to the third-party application;

receiving, by at least one computing device of the one or more computing devices, user input indicating selection of one or more creative tools and indicating one or more modifications to at least one of the image content or the video content to produce modified user content; and making, by at least one computing device of the one or more computing devices, the modified user content accessible to one or more users of the client application.

20. The method of claim 15, further comprising:

determining, by at least one computing device of the one or more computing devices, an augmented reality content item to apply to at least one of the image content or the video content captured by the camera of the client device;

modifying, by at least one computing device of the one or more computing devices, an appearance of one or more objects included in at least one of the image content or the video content by applying the augmented reality content item to the one or more objects to produce modified user content; and making, by at least one computing device of the one or more computing devices, the modified user content accessible to one or more users of the client application.

* * * * *